US011461514B2

United States Patent
Dogru

(10) Patent No.: US 11,461,514 B2
(45) Date of Patent: Oct. 4, 2022

(54) RESERVOIR SIMULATION WITH PRESSURE SOLVER FOR NON-DIAGONALLY DOMINANT INDEFINITE COEFFICIENT MATRICES

(71) Applicant: Saudi Arabian Oil Company, Dhahran (SA)

(72) Inventor: Ali Haydar Dogru, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 732 days.

(21) Appl. No.: 16/139,326

(22) Filed: Sep. 24, 2018

(65) Prior Publication Data

US 2020/0097622 A1 Mar. 26, 2020

(51) Int. Cl.
| | |
|---|---|
| *G06F 30/20* | (2020.01) |
| *G06F 17/16* | (2006.01) |
| *G01V 99/00* | (2009.01) |
| *E21B 43/00* | (2006.01) |
| *G06F 111/10* | (2020.01) |

(52) U.S. Cl.
CPC .............. *G06F 30/20* (2020.01); *E21B 43/00* (2013.01); *G01V 99/005* (2013.01); *G06F 17/16* (2013.01); *E21B 2200/22* (2020.05); *G01V 2210/624* (2013.01); *G06F 2111/10* (2020.01)

(58) Field of Classification Search
CPC ................................. G06F 30/23; G06F 30/20
See application file for complete search history.

(56) References Cited

U.S. PATENT DOCUMENTS

| | | | | |
|---|---|---|---|---|
| 8,650,016 B2 * | 2/2014 | Lunati | ..................... | G06F 30/23 |
| | | | | 703/2 |
| 8,903,694 B2 * | 12/2014 | Wallis | ..................... | G06F 30/20 |
| | | | | 703/2 |

(Continued)

FOREIGN PATENT DOCUMENTS

EP 2960430 A2 12/2015

OTHER PUBLICATIONS

Ilse C.F. Ipsen and Carl D. Meyer; "The Idea Behind Krylov Methods"; Nov. 1997 The American Mathematical Monthly 105(10) DOI:10.2307/2589281 (Year: 1997).*

(Continued)

*Primary Examiner* — Akash Saxena
(74) *Attorney, Agent, or Firm* — Bracewell LLP; Constance G. Rhebergen; Brian H. Tompkins

(57) ABSTRACT

Performance of computers is improved during determination of pressure distribution among grid cells of a reservoir model during reservoir simulation by computer processing. Convergence can prove difficult to obtain when conditions cause a coefficient matrix involved in the processing to become indefinite. An indefinite coefficient matrix can occur either due to physical conditions in the reservoir related to vapor liquid equilibria, or due to nonphysical conditions created numerically due to improper derivatives. The conventional previously taken corrective action of time step cutting is avoided when convergence becomes difficult during reservoir simulation. Time step cutting has proven to be very costly, in terms of computer usage and time, for very large reservoirs having models involving millions, billions or more number of unknown parameter values.

14 Claims, 10 Drawing Sheets

(56) References Cited

U.S. PATENT DOCUMENTS

| | | | | |
|---|---|---|---|---|
| 8,924,186 | B1* | 12/2014 | Zhao | G06F 30/23 |
| | | | | 703/2 |
| 9,063,882 | B1* | 6/2015 | Zhao | F01K 21/047 |
| | | | | 422/607 |
| 9,206,671 | B2* | 12/2015 | Shetty | E21B 41/00 |
| 9,418,180 | B2* | 8/2016 | Maliassov | G06F 30/20 |
| 9,540,911 | B2* | 1/2017 | Stone | E21B 43/00 |
| 10,209,685 | B2* | 2/2019 | Kniazev | G06F 17/16 |
| 10,242,136 | B2* | 3/2019 | Fung | G06F 17/16 |
| 10,762,258 | B2* | 9/2020 | Fung | G06F 30/30 |
| 11,066,907 | B2* | 7/2021 | Dogru | G06F 30/20 |
| 2007/0255779 | A1* | 11/2007 | Watts, III | G06F 17/16 |
| | | | | 708/520 |
| 2008/0167849 | A1* | 7/2008 | Hales | E21B 43/00 |
| | | | | 703/10 |
| 2010/0082509 | A1* | 4/2010 | Mishev | G06F 17/12 |
| | | | | 706/14 |
| 2011/0098998 | A1 | 4/2011 | Lunati et al. | |
| 2011/0191080 | A1* | 8/2011 | Klie | G06F 30/00 |
| | | | | 703/10 |
| 2011/0320177 | A1* | 12/2011 | Bowen | E21B 49/00 |
| | | | | 703/2 |
| 2012/0179436 | A1* | 7/2012 | Fung | E21B 49/00 |
| | | | | 703/2 |
| 2012/0203515 | A1* | 8/2012 | Pita | E21B 49/00 |
| | | | | 703/2 |
| 2012/0221303 | A1* | 8/2012 | Wallis | G06F 30/20 |
| | | | | 703/2 |
| 2013/0085730 | A1* | 4/2013 | Shaw | G06F 17/12 |
| | | | | 703/2 |
| 2013/0116993 | A1 | 5/2013 | Maliassov | |
| 2013/0124168 | A1 | 5/2013 | Jain et al. | |
| 2013/0132049 | A1* | 5/2013 | Dogru | E21B 41/0035 |
| | | | | 703/2 |
| 2013/0211800 | A1 | 8/2013 | Fung | |
| 2013/0226540 | A1* | 8/2013 | Pita | G01V 99/00 |
| | | | | 703/2 |
| 2014/0025720 | A1 | 1/2014 | Strzodka | |
| 2014/0046993 | A1* | 2/2014 | Castonguay | G06F 17/12 |
| | | | | 708/446 |
| 2014/0207426 | A1* | 7/2014 | Shin | G06F 30/20 |
| | | | | 703/2 |
| 2015/0066463 | A1* | 3/2015 | Shetty | G06G 7/32 |
| | | | | 703/10 |
| 2015/0073763 | A1* | 3/2015 | Wang | E21B 43/00 |
| | | | | 703/10 |
| 2015/0186562 | A1* | 7/2015 | Johnson | E21B 43/26 |
| | | | | 703/2 |
| 2015/0338550 | A1* | 11/2015 | Wadsley | E21B 43/00 |
| | | | | 703/2 |
| 2016/0162612 | A1* | 6/2016 | Lukyanov | G06F 30/20 |
| | | | | 703/2 |
| 2016/0202389 | A1* | 7/2016 | Malvesin | G06F 17/16 |
| | | | | 703/2 |
| 2016/0341015 | A1* | 11/2016 | Fung | G06F 30/30 |
| 2017/0003409 | A1 | 1/2017 | Akcelik et al. | |
| 2019/0218895 | A1* | 7/2019 | Mohebbinia | E21B 43/168 |
| 2019/0236227 | A1* | 8/2019 | Gope | G06T 17/20 |
| 2020/0097622 | A1* | 3/2020 | Dogru | G06F 30/23 |
| 2020/0325765 | A1* | 10/2020 | Henon | G01V 99/005 |

OTHER PUBLICATIONS

International Search Report and Written Opinion for related PCT application PCT/US2019/050875 dated Dec. 9, 2019.

Al-Marhoun, The Compressibility below Bubble Point Pressure Revisited—Formulations and Estimations, 2009 SPE Middle East Oil & Gas Show and Conference, Mar. 15-18, 2009, SPE 120047, Kingdom of Bahrain.

Dogru, "A Next Generation Parallel Reservoir Stimulator for Giant Reservoirs", SPE 119272, 2009 SPE Reservoir Simulation Symposium in The Woodlands, TX, USA, Feb. 2-4, 2009.

Dogru, et al., "New Frontiers in Large Scale Reservoir Simulation", SPE 142297, SPE Reservoir Simulation Symposium, The Woodlands, TX, USA, Feb. 21-23, 2011.

Harisch et al, Evaluation of a Horizontal Gas-Condensate Well Using Numerical Pressure Transient Analysis, 2001 Society of Petroleum Engineers Inc Annual Technical Conference and Exhibition, Sep. 30 through Oct. 3, 2001, pp. 1-17, SPE71588, New Orleans, LA.

Ambers, Jim, Gram-Schmidt Orthogonalization, MAT 415/515, Fall Semester 213-14, Lecture 3 Notes; pp. 1-5 http://www.math.usm.edu/lambers/mat415/lecture3.pdf.

Olsen-Kettle, Numerical Solution of Partial Differential Equations, The University of Queenland, School of Earth Science, Centre for Geoscience Computing, Chapt. 4.2.

Saad, "Iterative Methods for Sparse Linear Systems", Jan. 2000, Chpt. 10, pp. 265-319.

Stuben, Klaus, "Solving Reservoir Simulation Equations", 9th International Forum on Reservoir Simulation, Abu Dhabi, United Arab Emirates; Dec. 9-13, 2007, pp. 1-53.

Tan, et al, Application of D4 Ordering and Minimization In An Effective Partial Matrix Inverse Iterative Method, Sixth SPE Symposium on Reservir Simulation of the Society of Petroleum Engineers, Jan. 31-Feb. 3, 1982, pp. 43-57, SPE 10493, New Orleans, LA.

Wallis et al, An Iteratiave Matrix Solution Technique for Steamflood Simulation, 1982 Sixth Symposium on Reservoir Simulation of the Society of Petroleum Engineers of AIME, Jan. 31-Feb. 3, 1982, pp. 15-28, SPE 10491, New Orleans, LA.

Wikipedia, "Gaussian Elimination" pp. 1-8; https://en.wikipedia.org/wiki/Gaussian_elimination.

* cited by examiner

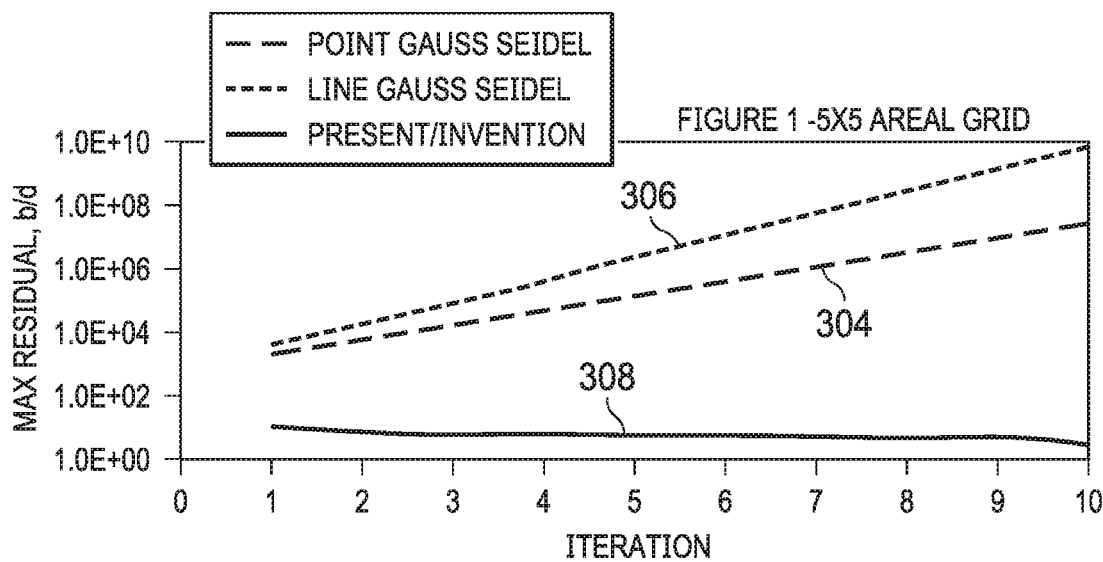
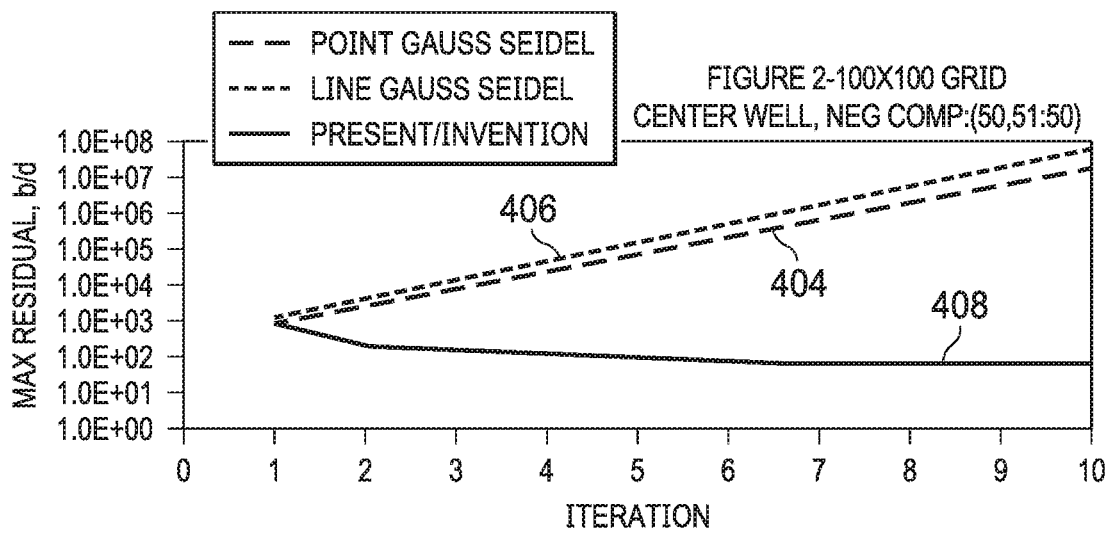

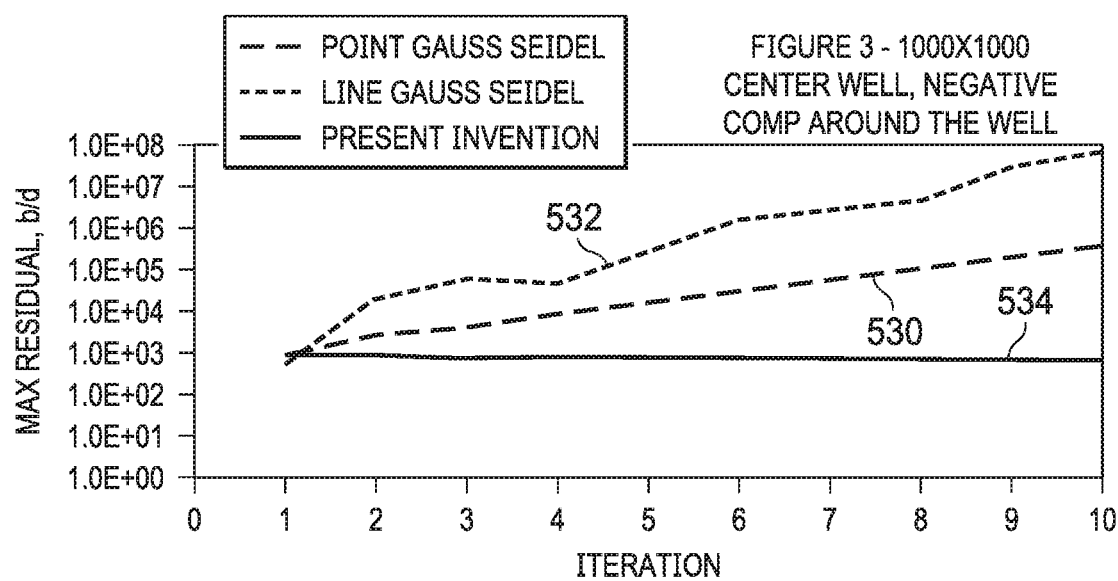

RESERVOIR SIMULATION WITH PRESSURE SOLVER FOR NON-DIAGONALLY DOMINANT INDEFINITE COEFFICIENT MATRICES

BACKGROUND OF THE INVENTION

1. Field of the Invention

The present involves reservoir simulation, and in particular simulation methodologies which take into account both fluid flow and pressure distribution in the reservoir during production of fluids.

2. Description of the Related Art

In the oil and gas industries, massive amounts of data are required to be processed for computerized simulation, modeling, and analysis for exploration and production purposes. For example, the development of underground hydrocarbon reservoirs typically includes development and analysis of computer simulation models of the reservoir. A realistic simulation model of the reservoir, and the presence of its fluids, helps in forecasting the optimal future oil and gas recovery from hydrocarbon reservoirs. Oil and gas companies have come to depend on simulation models as an important tool to enhance the ability to exploit a petroleum reserve.

The underground hydrocarbon reservoirs are typically complex rock formations which contain both a petroleum fluid mixture and water. The reservoir fluid content usually exists in two or more fluid phases. The petroleum mixture in reservoir fluids is produced by wells drilled into and completed in these rock formations. Sometimes, fluids such as either water or gases or both are also injected into these rock formations to improve the recovery of the petroleum fluids.

Reservoir simulation belongs to the general domain of flow in porous media simulation. However, reservoir simulation normally involves multiple hydrocarbon components and multiple fluid phases in an underground geological formation which is under high pressure and temperature. The chemical phase behavior of these hydrocarbon fluids and the included groundwater has to be taken into account in these simulators.

The simulation models contain volumetric data which describe the specific geometry of the rock formations and the wells, and also reservoir properties data, such as the fluid and rock properties, as well as production and injection history pertaining to the specific reservoirs of the oil or gas field in question. The simulation models are formed by a simulator (known as a reservoir simulator) which is a suite of computer programs run on a data processing system S.

The reservoir simulator which runs these models is a computer implemented numerical methodology, or coded algorithms and data constructs of an underlying mathematical model. The mathematical model which represents the physics of fluid movements in these hydrocarbon reservoirs is a system of nonlinear partial differential equations which describe the transient multiple-phase, multiple-component fluid flow, and material balance behaviors in these reservoirs induced by the production injection of fluids, as well as the pressure-volume-temperature (PVT) relationships of the reservoir fluids.

A reservoir simulator simulates the multiphase multicomponent fluid flow and material balance in subterranean reservoirs and the included surrounding porous rock formations by subdividing the volume into contiguous cells, also known as grid blocks. In simulation models, the reservoir is thus organized into a number of individual cells. A cell or grid block is the basic finite volume where the underlying mathematical model is applied. The number of cells varies depends on the resolution needed for the simulation and the size of the reservoirs in question.

For a large reservoir, such as the type known in the industry as a giant reservoir, which may have multi-billion barrels of original oil-in-place (OOIP), the number of grid cells can be in the hundreds of millions to over a billion. This number of cells is required in order to have adequate resolution to represent flow dynamics, formation rock porosity and permeability heterogeneity, and many other geologic and depositional complexities within the reservoir. Simulation of this size reservoir can be termed giga-cell reservoir simulation. FIG. 1 shows at 100 an example structured reservoir grid model of a subsurface reservoir for reservoir simulation.

The challenges in hydrocarbon reservoir simulation require the use of the latest technology to maximize recovery in a cost-effective manner. Reservoir simulations such as those provided under the trademark GigaPOWERS have been described in the literature. See for example, articles by Dogru, A. H. et al, "A Next-Generation Parallel Reservoir Simulator for Giant Reservoirs," SPE 119272, proceedings of the 2009 SPE Reservoir Simulation Symposium, The Woodlands, Tex., USA, Feb. 2-4, 2009 and by Dogru, A. H; Fung, L. S; Middya, U.; Al-Shaalan, T. M.; Byer, T.; Hoy, H. Hahn, W. A.; Al-Zamel, N.; Pita, J.; Hemanthkumar, K.; Mezghani, M.; Al-Mana, A.; Tan, J.; Dreiman, T.; Fugl, A.; Al-Baiz, A.; "New Frontiers in Large Scale Reservoir Simulation," SPE 142297, Proceedings of the 2011 SPE Reservoir Simulation Symposium, The Woodlands, Tex., USA, Feb. 21-23, 2011. GigaPOWERS reservoir simulation is capable of fine-scale grid simulation that exceeds a billion-cell barrier for post-processing while utilizing hundreds of gigabytes (GB) footprint per scenario.

The total number of simulation runs for a company with a number of hydrocarbon reservoirs and appreciable reserves exceeds multiple tens of thousands per year, and one or more petabytes of high performance storage is required to host these data.

The transient solution of the multiphase multicomponent system involves the evolution of mass and energy conservation in a sequence of time steps from the initial condition of the reservoir. For each time step, the system of nonlinear discrete equations for each finite volume is linearized using what is known as the generalized Newton's method.

In the industry, this is referred to as Newtonian iteration or nonlinear iteration. At each Newtonian iteration, a linear system of equations is constructed where the matrix, known as the Jacobian matrix, and the right-hand-side vector, known as the residuals, are used to solve for the changes in the primary variables of the system.

Other factors about the reservoir further increased the complexity of giga-scale reservoir simulation. The subsurface rock in the formations is not homogenous in either permeability or porosity. For highly heterogeneous reservoirs, iterative methods may not converge in calculating reservoir pressure distribution. This introduces additional complexities to the simulation processing.

Current industry practice for solving the linear system of equations is via a preconditioned iterative method. An example of preconditioning is described, for example in Saad, "Iterative Methods for Sparse Linear Systems," January, 2000, Ch. 10, Pp. 265-319. The computationally expensive preconditioner methods increase the computational cost. Further, preconditioning methods do not guarantee convergence to an exact solution.

A preconditioner can generally provide a good estimate for the unknown pressure and saturation distribution within the reservoir. This initial estimate is then improved by iterations to the correct pressure and saturation distribution for the time step. One method used as a preconditioner is known as the Gauss Seidel method which is used because of its simplicity and lower comparative computational cost per iteration. The Gauss Seidel preconditioning may take the form of what are known as Point Gauss Seidel or Linear Gauss Seidel preconditioners. Direct solutions of grid cell pressure of the reservoir matrix for the next simulator time step are determined and the residuals are evaluated. This processing continues until the calculated residuals for the grid are less than a specified tolerance. An example Gauss Seidel methodology is described in Olsen-Kettle, "Numerical Solution of Partial Differential Equations", March, 2011, Chapter 4.2, Pp. 28-33, The University of Queensland. It has been found, however, that Gauss Seidel preconditioning often shows very slow convergence in obtaining grid cell pressures where there are residuals within the specified tolerance, especially for reservoirs with highly heterogeneous formation rock characteristics.

The pressure equation plays an important role in reservoir simulation. The pressure conditions determined during reservoir simulation represent the pressure conditions at a specified time step of interest for the reservoir grid cells in the model of the reservoir. During the reservoir simulation processing, either due to physical or numerical processing reasons, the coefficient matrix may become non-diagonally dominant, or indefinite, during the simulation. This causes the iterative methods to diverge. So far as is known, current practice is to reduce the time step size, and reconstruct the coefficient matrix, and repeat processing with the reduced size time step. In these situations, the simulation processing can be very expensive in terms of computer operating time and costs for large number of unknowns, which is the case for any sizable reservoir, and particularly the case for giant reservoirs.

SUMMARY OF THE INVENTION

Briefly, the present invention provides a computer implemented method of reservoir simulation of fluid flow in a producing reservoir with improved convergence of determining pressure distribution within the reservoir to determine simulated fluid flow in the reservoir for a sequence of time steps of projected production from the reservoir, the reservoir being organized into a three dimensional grid of reservoir cells, the reservoir simulation being performed for the sequence of time steps based on actual fluid pressures and fluid production from wells in the reservoir, the computer implemented method determining simulated fluid flow from the three dimensional grid of reservoir cells to the wells and simulated well production rates of the wells.

The computer implemented method forms an initial computer matrix of known reservoir attributes and an initial computer vector of actual reservoir fluid production measures for a time step in the sequence of time steps. Next, a determination is made if the initial computer matrix of known reservoir attributes is diagonally dominant.

If so, pressure distribution is determined in the individual ones of grid cells of the reservoir for the time step of the reservoir simulation based on the formed initial measure of pressure distribution in the individual ones of the grid cells of the reservoir. An estimated fluid flow rate in the grid cells of the reservoir is then determined for the time step of the reservoir simulation based on the determined estimated pressure distribution in the grid cells of the reservoir. The computer then determines whether the determined fluid flow rate in the grid cells of the reservoir has converged; and, if so, the reservoir simulation of fluid flow in the reservoir for the time step ends.

If the initial computer matrix of known reservoir attributes is not diagonally dominant, an approximate analytical preconditioner is generated. The generated approximate analytical preconditioner is then applied to the initial computer matrix of known reservoir attributes to form measures of pressure distribution in the grid cells of the reservoir. Krylov vectors are generated from the formed measures of pressure distribution in the grid cells of the reservoir, and coefficient vectors of reservoir pressure distribution are determined from the generated Krylov vectors from the formed measures of pressure distribution.

An estimated fluid flow rate in the grid cells of the reservoir is determined for the time step of the reservoir simulation based on the determined coefficient vectors of reservoir pressure distribution. It is then determined whether the estimated fluid flow rate in the grid cells of the reservoir based on the determined coefficient vectors of reservoir pressure distribution has converged. If so, reservoir simulation of fluid flow in the reservoir is the ended for the time step.

The present invention also provides a new and improved data processing system performing reservoir simulation of fluid flow in a producing reservoir with improved convergence of determining pressure distribution within the reservoir to determine simulated fluid flow in the reservoir for a sequence of time steps of projected production from the reservoir, the reservoir being organized into a three dimensional grid of reservoir cells, the reservoir simulation being performed for the sequence of time steps based on actual fluid pressures and fluid production from wells in the reservoir.

The data processing system includes a processor determining simulated fluid flow from the three dimensional grid of reservoir cells to the wells and simulated well production rates of the wells. The processor forms an initial computer matrix of known reservoir attributes and an initial computer vector of actual reservoir fluid production measures for a time step in the sequence of time steps. Next, a determination is made in the processor if the initial computer matrix of known reservoir attributes is diagonally dominant.

If so, pressure distribution is determined in the individual ones of grid cells of the reservoir by the processor for the time step of the reservoir simulation based on the formed initial measure of pressure distribution in the individual ones of the grid cells of the reservoir. An estimated fluid flow rate in the grid cells of the reservoir is then determined by the processor for the time step of the reservoir simulation based on the determined estimated pressure distribution in the grid cells of the reservoir. The processor then determines whether the determined fluid flow rate in the grid cells of the reservoir has converged; and, if so, the reservoir simulation of fluid flow in the reservoir by the processor for the time step ends.

If the initial computer matrix of known reservoir attributes is not diagonally dominant, an approximate analytical preconditioner is generated by the processor. The generated approximate analytical preconditioner is then applied by the processor to the initial computer matrix of known reservoir attributes to form measures of pressure distribution in the grid cells of the reservoir. Krylov vectors are generated by the processor from the formed measures of pressure distribution in the grid cells of the reservoir, and coefficient vectors of reservoir pressure distribution are determined from the generated Krylov vectors from the formed measures of pressure distribution.

An estimated fluid flow rate in the grid cells of the reservoir is determined by the processor for the time step of the reservoir simulation based on the determined coefficient vectors of reservoir pressure distribution. It is then determined whether the estimated fluid flow rate in the grid cells of the reservoir based on the determined coefficient vectors of reservoir pressure distribution has converged. If so, reservoir simulation of fluid flow in the reservoir by the processor is the ended for the time step.

BRIEF DESCRIPTION OF THE DRAWINGS

FIG. 9 is a display of comparative results of convergence error during pressure distribution pressure distribution determination for the reservoir model of FIG. 8.

FIG. 11 is a display of comparative results of convergence error during pressure distribution pressure distribution determination for the reservoir model of FIG. 10 according to the present invention in comparison with prior art methods.

FIG. 13 is a display of comparative results of convergence error in pressure distribution determination according to the present invention against processing results according to the prior art.

DETAILED DESCRIPTION OF THE PREFERRED EMBODIMENTS

Figure 1:
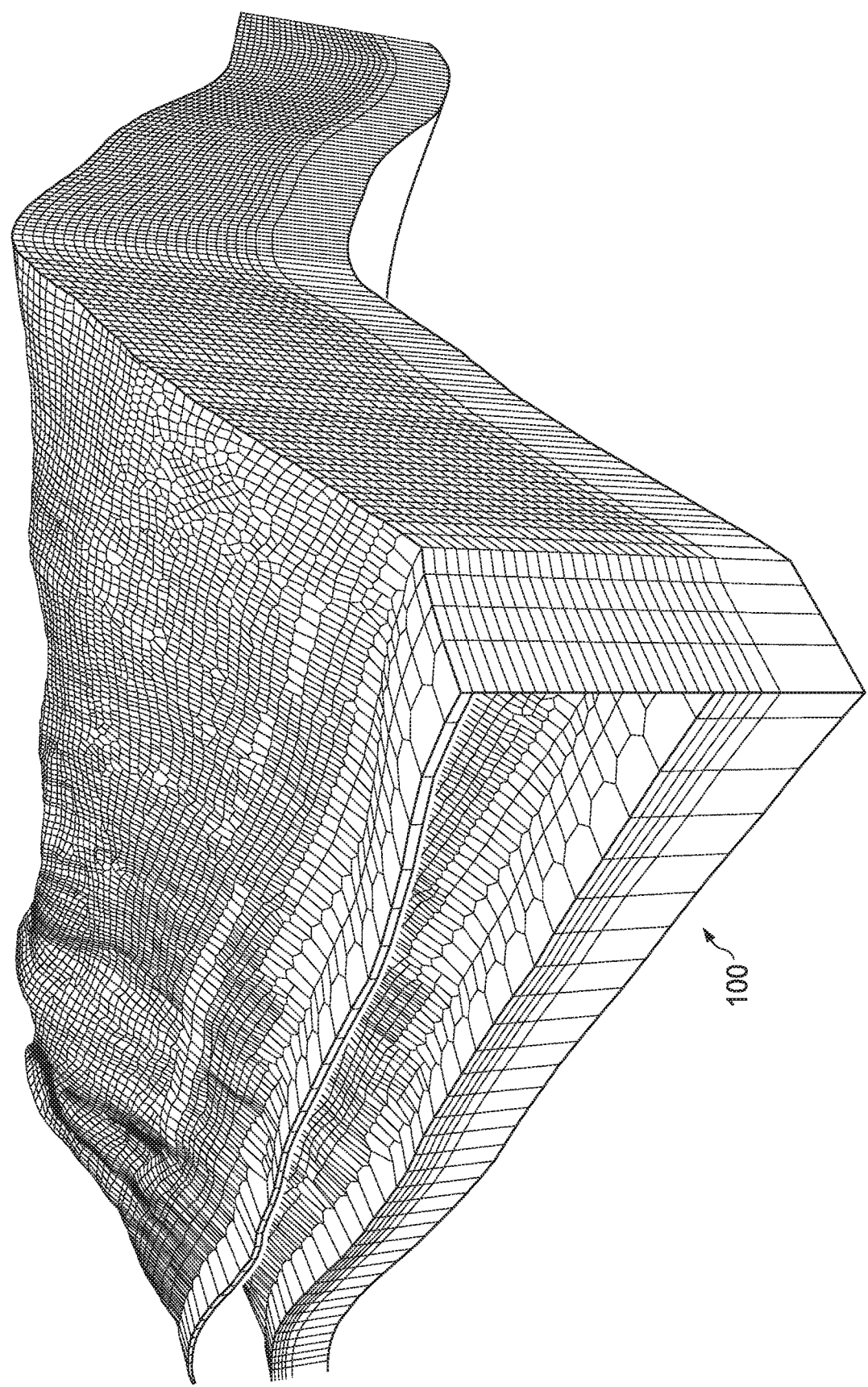
FIG. 1 is an isometric view of a computerized model of a subsurface reservoir structured grid for reservoir simulation.

In numerical reservoir simulation, based on the formulation, a pressure equation is formed either explicitly or included in the main body of the flow equations. Fluid velocities, and hence the flow of oil, water and gas are computed from the pressure distribution. It is thus important that the pressure fields be computed properly.

In reservoir simulation, flow equations are linearized and a coefficient matrix is formed to solve for the unknowns. The coefficient matrix generally is known as a Jacobian matrix. The coefficient or Jacobian matrix contains the first derivatives of the unknowns such as pressure with respect to the variables which to be determined through the reservoir simulation. An example Jacobian matrix is shown in Equation (1) set forth below.

Underground fluid reservoirs are highly heterogeneous in rock properties. These heterogeneities are reflected in the coefficients of the partial differential equation describing the fluid flow and pressure distribution in the reservoir.

Often simulators face convergence problems due to difficulties in finding a proper pressure solution at a time step during the simulation processing. Therefore, correctly computed pressure solutions are critical for simulators to procced in a time domain and determine reservoir performance with reasonable computational cost.

The present invention has been developed for the reservoir simulator's pressure equation to converge with an indefinite coefficient matrix present in the parameters on which determination of pressure conditions in the grid cells are based. Indefinite coefficient matrices can occur either due to simulating physical conditions related to vapor liquid equilibria, or due to nonphysical conditions created numerically due to improper derivatives computed.

Previous iterative methods diverge for indefinite coefficient matrices. The present invention converges in the event that indefinite coefficient matrices are encountered. The present invention allows the reservoir simulation process to continue without reducing time step size. Reduction of time step size is costly in terms of computer processing time and reservoir simulation runs where there are large numbers of unknowns, in the order of millions and billions and more. The present invention avoids time step cutting which could be very costly for very large system of equations involving million, billions or more number of unknowns. The present invention determines pressure conditions with indefinite reservoir coefficient matrix by a new iterative method and allows a reservoir simulator to continue simulation without cutting the time step size.

The pressure equation plays an important role in simulating the fluid flow in reservoir simulation. Depending on the numerical solution scheme selected, either a separate pressure equation may be formed or the same unknown is solved simultaneously with other reservoir parameter unknowns. According to the present invention, the reservoir simulator forms a separate pressure equation and next time step pressures for the reservoir simulation are solved by solving a linear system of equations expressed in general matrix form as shown in Equation (1):

$$[A][p]=[b] \qquad (1)$$

For Equation (1) in the context of pressure distribution determination for a reservoir, A is a known coefficient matrix, b is the known right hand side vector of actual reservoir production measures, and p is the unknown pressure vector for the next time step. The coefficient matrix A is a sparse n×n matrix resulting from the discretization of the partial differential equations describing the fluid flow, as will be described. In Equation (1), b is an n×1 row vector which usually includes usually includes old time step information and well production/injection rates, where n is the total number of unknown pressure vectors.

Nomenclature

Set forth below for ease of reference and understanding is a listing of the nomenclature used in the Equations which represent the various parameters, measurements and units of measure according to the present invention.

P=pressure, pounds per square inch (psi)
$\bar{p}$=average pressure (psi)
$p_{max}$=maximum pressure (psi)
t=time (days)
$\Delta$t=time change (days)
L=distance, feet (ft.)
x=distance in x direction (ft.)
y=distance in y direction (ft.)
$\Delta$x=grid block dimension in x direction
$\Delta$y=grid block dimension in y direction
$\Delta$z=grid block dimension in z direction
q=production rate, barrels per day (b/d)
r=radial distance from a point $x_*$ (ft.)
Vp=Pore Volume, barrels (1 barrel=5.615 cubic feet, 1 ft.=30.48 centimeters)
$C_T$=Total compressibility (1/psi)
$C_o$=Oil compressibility (1/psi)
$C_w$=Water compressibility (1/psi)
$C_g$=Gas compressibility (1/psi)
$C_p$=Pore compressibility (1/psi)
$\emptyset$=porosity
K=permeability, (mD)
$\mu$=viscosity, centipoise (cP)
<x,y>=$x^T y$=Inner Product of vector x and vector y The Pressure Equation in Differential Form and in Discretized Form Consider as an example a square flat single phase oil reservoir V (FIG. 2) with constant fluid properties, operating above the bubble point of fluids in the reservoir. A partial differential equation describing reservoir pressures p for a linearized, slightly compressible single phase fluid is given as follows:

$$\frac{\partial}{\partial x}k_x\frac{\partial p}{\partial x} + \frac{\partial}{\partial y}k_y\frac{\partial p}{\partial y} + \frac{\partial}{\partial z}k_z\frac{\partial p}{\partial z} + q = \emptyset \mu C_t \frac{\partial p}{\partial t} \quad (2)$$

Where p is the unknown pressure distribution due to source or sinks (wells) with a flow strength q operating in the reservoir. The parameter k represents a varying permeability in x, y, z direction of dimensional co-ordinance in the reservoir model 100. The parameter $C_t$ is the total fluid and rock compressibility, and the parameter t is the time. The form of this expression is comparable to that defining a volume balance relationship.

Equation (2) is based on there being a unique solution for p (x, y, z, t) for given outer and inner boundary conditions and initial conditions for the pressure distribution in the reservoir.

For a simplified example (consider two dimensions in x and y only), Equation (2) becomes $$\frac{\partial}{\partial x}k_x\frac{\partial p}{\partial x} + \frac{\partial}{\partial y}k_y\frac{\partial p}{\partial y} + q = \emptyset \mu C_t \frac{\partial p}{\partial t} \quad (3)$$

Assuming that such a simplified two-dimensional reservoir model such as a reservoir model V (FIG. 2) is organized or divided into grid blocks (control volumes). For a more generalized example, a reservoir model is composed of $N_x$ as a number of grid blocks in the x dimension, and $N_y$ a number of grid blocks in the y dimension. The total number of grid blocks in a two-dimensional reservoir is n, where n=$N_x$*$N_y$.

Figure 2:
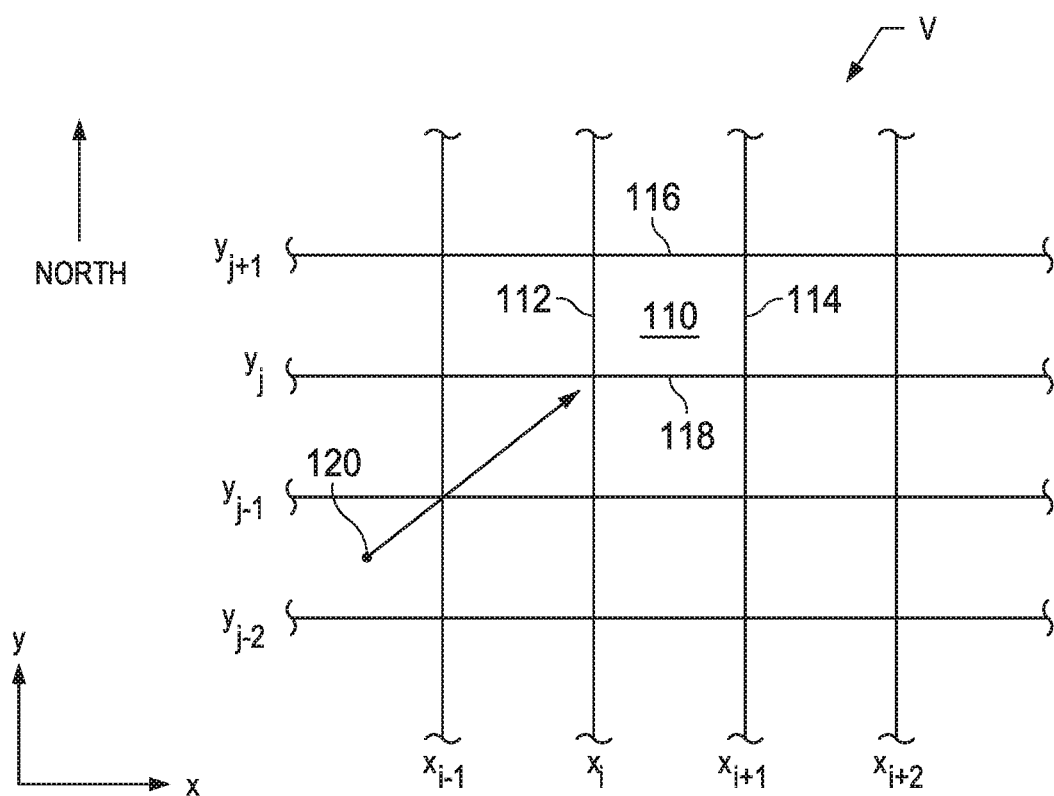
FIG. 2 is a plan view of a segment of a simplified example two-dimensional reservoir model.

In the model V of FIG. 2, i and j are assigned as numbering sequence indexes in the x and y directions, respectively. In the x direction, i=1, 2 . . . $N_x$; and in the y direction, j=1, 2, . . . , Ny. Equation (4) below represents for the model V a finite difference form of the discretized system for the differential equation of Equation (3). To solve for the unknown function p in Equation (3), the x-y domain of model V is divided into computational elements shown in FIG. 2. Equation (4) can be expressed as follows:

$$T_{i-1/2,j}(p_{i-1,j}^{n+1} - p_{i,j}^{n+1}) + T_{i+1/2,j}(p_{i+1,j}^{n+1} - p_{i,j}^{n+1}) + T_{i,j-1/2}(p_{i,j-1}^{n+1} - p_{i,j}^{n+1}) + \quad (4)$$

$$T_{i,j-1/2}(p_{i,j+1}^{n+1} - p_{i,j}^{n+1}) - q_{i,j} = c_t V_{p_{i,j}} \frac{p_{i,j}^{n+1} - p_{i,j}^n}{\Delta t}$$

where T is the transmissibility describing the linking flow between the grid block (cell) (i,j) and its neighbor. Transmissibility in a reservoir model is a measure representing the conductivity of the formation grid cell elements corrected for the viscosity of the flowing fluid. $V_{p_{ij}}$ is the pore volume of the element (i,j). $c_t$ is the total rock and fluid compressibility of that element (i,j).

In Equation (4), the superscript n indicates the old time step, and the superscript (n+1) indicates the new time step, $\Delta$t is the time step size between the new time t(n+1) and old time t(n), and $V_p$(i,j) is the pore volume of the grid block.

With the reservoir model V as an example, west transmissibility of a cell 110 at coordinates (i,j) is represented by $T_{i-1/2,j}$ where (i−½, j) means a west face 112 of the grid block 110 at coordinates (i,j). Similarly $T_{i+1/2,j}$ is the transmissibility of an east face 114 for the same cell 110. In a comparable manner, transmissibility of a north face 116 of cell 110 is represented by $T_{i,j+1/2}$ and a transmissibility of a south face 118 of cell 110 is represented by $T_{i,j-1/2}$.

In general, transmissibility T of a face in a grid to cellblock in the x dimension is defined as:

$$T_{i+1/2,j} = C_1 k_{i+\frac{1}{2},j} A_{i+1/2j} \frac{1}{(x_{i+1,j} - x_{i,j})} \quad (5)$$

where $$k_{i+\frac{1}{2},j}$$

is the harmonically averaged permeability between grid blocks (i+1, j) and (i,j), A is the interface area of the grid block, and x is the x coordinate of the grid block. In Equation (5), $C_1$=1.127E-3, which is a unit conversion factor. Conversion factor $C_1$ converts the fluid flow rate in metric units of measure of cubic centimeters per second to practical oil field units, barrels per day. Thus, transmissibility T is expressed in volume, time, and pressure units of measure of barrel/day/psi when the x or y distances in a reservoir model are expressed in ft; area A in ft$^2$; and permeability k is expressed in millidarcy, rather than Darcy, units of measure.

The pressure distribution at the time step n for each grid block in the reservoir is known as a result of the previous time step. The unknown pressures for each grid block for the new time step can be obtained by forming a linear system of equations by writing Equation (4) for the cells and rearranging into a matrix form of Equation (6).

Rearranging Equation (4) for a grid block (i,j) results in Equation (6) as follows:

$$T_{i-1/2,j}(p_{i-1,j}^{n+1}) + T_{i+1/2,j}(p_{i+1,j}^{n+1}) + \qquad (6)$$

$$T_{i,j-1/2}(p_{i,j-1}^{n+1}) + T_{i,j-1/2}(p_{i,j+1}^{n+1}) -$$

$$\left(T_{i-1/2,j} + T_{i+1/2,j} + T_{i,j-1/2} + T_{i,j+1/2} + \frac{C_t V_p(i,j)}{\Delta t}\right) =$$

$$q_{i,j} - C_t V_{p_{i,j}} \frac{p_{i,j}^{n+1} - p_{i,j}^n}{\Delta t}$$

For convenience, the east face designator (i+½, j) in Equation (6) has been replaced by the abbreviation "E" to indicate an east face; the west face designator (i−½, j) by the abbreviation "W" indicating west face; the north face designator (i, j+½) by the abbreviation "N" indicating north face; and the south face days designator (i, j−½) by the abbreviation "S" indicating south face.

Equation (6) in matrix form for the unknown pressure vector at time step (n+1) can then be expressed in matrix form as Equation (7) in the following form:

$$\begin{bmatrix} T_{c,1} & T_{e,1} & 0 & 0 & T_{s,1} & & 0 & & 0 \\ T_{w,2} & T_{e,2} & T_{e,2} & 0 & & T_{s,2} & 0 & 0 & 0 \\ 0 & T_{w,3} & T_{c,3} & T_{e,3} & 0 & & T_{s,3} & 0 & 0 \\ & & \cdot & \cdot & \cdot & & & & 0 \\ 0 & T_{N,k} & 0 & & T_{w,k} & T_{c,k} & T_{e,k} & & T_{S,k} & 0 \\ & 0 & & & & 0 & & & & \\ 0 & & 0 & 0 & & & & & 0 \\ \cdot & & & & & \cdot & \cdot & \cdot & 0 \\ 0 & & & & 0 & T_{N,n-1} & 0 & T_{w,n-1} & T_{c,n-1} & T_{e,n-1} \\ 0 & 0 & 0 & & & 0 & T_{N,n} & 0 & T_{w,n} & T_{c,n} \end{bmatrix} \cdot \begin{bmatrix} p_1^{n+1} \\ p_2^{n+1} \\ \cdot \\ \cdot \\ \cdot \\ \cdot \\ \cdot \\ \cdot \\ \cdot \\ p_n^{n+1} \end{bmatrix} = \begin{bmatrix} q_1 - \frac{V_{p_1} C_T}{\Delta t} p^n \\ q_2 - \cdot \cdot \\ \cdot \\ \cdot \\ \cdot \\ \cdot \\ \cdot \\ \cdot \\ q_n - \frac{V_{p_n} C_T}{\Delta t} p^n \end{bmatrix} \qquad (7)$$

As with Equation (6), for convenience in Equation (7) the east face designator (i+½, j) has been replaced by the abbreviation "E" to indicate an east face; the west face designator (i−½, j) by the abbreviation "W" indicating west face; the north face designator (i, j−½) by the abbreviation "N" indicating north face; and the south face days designator (i, j+½) by the abbreviation "S" indicating south face. In oil field units, Equation (7) is in units of barrel per day per psi pressure change, or cubic centimeters per second per atmosphere pressure difference.

In the rights hand side of Equation (7), $q_i$ is the production or injection rate at a given grid block and the term $$\frac{V_{p_k} C_T}{\Delta t} p_k^n$$

is the product of pore volume $v_p$ of grid block k, total compressibility $C_T$ and old time step pressure $p_k$ of the grid block k per time step size $\Delta t$.

The linear system of equations in Equation (7) is organized in the matrix form of Equation (1) expressed in terms of parameters defined according to the Nomenclature section as:

$$[T] [p] = \left[q - \frac{V_p c_T}{\Delta T} p^n\right] \qquad (8)$$

Where in Equation (8), [T] is the coefficient matrix in terms of fluid transmissibility corresponding to the coefficient matrix [A] in Equation (1), $$\left[q - \frac{V_p c_T}{\Delta T} p^n\right]$$

is the right hand side vector of Equation (8) comprised of the source terms, pore volume, total compressibility and time step size corresponding to the right hand side matrix [b] in Equation (1), and p is the unknown pressure vector at time step (n+1).

Reservoir Models

The structured reservoir grid model of an actual example subsurface reservoir, such as shown at 100 in FIG. 1, is composed of grid blocks (computational elements) with each element having a single unknown pressure p. Reservoir models are divided into millions of elements. Therefore, the matrix A can be very large, that is, a million by million sparse matrix. Because of the large size of the coefficient matrix A for the reservoir model, a direct method of solution such as by the process known as Gaussian Elimination is computationally very expensive and slow. Therefore, iterative solution methods are normally used to solve Equation (1).

Challenges to Iterative Methods

Iterative methods work well if the matrix is strongly diagonally dominant. This also means that all the eigenvalues of the matrix have the same sign (either positive or negative). When the matrix losses diagonal dominance (when an eigenvalue changes sign), the coefficient matrix A in Equation (1) becomes indefinite. So far as is known, iterative methods do not converge for indefinite matrices.

Matrix Terminology and Iterative Methods
Eigenvalues of a Matrix

Eigenvalues of a square matrix [A] according to Equation (1) having n rows and n columns are defined as the roots of the following expression of a relationship for the determinant of the matrix [A] as follows:

$$\det(A-\lambda I)=0 \quad (9)$$

which results in a polynomial of degree n defined as follows:

$$\lambda^n + c_1\lambda^{n-1} + \ldots c_{n-1} = 0 \quad (10)$$

The eigenvalues of matrix [A] are roots which satisfy the polynomial expression of Equation (10). The coefficient matrix is the same matrix in Equation (1) which is used in the reservoir simulator to solve for the pressure distribution in the reservoir. The eigenvalues of matrix [A] represented by $\lambda$ includes variables such as transmissibility T defined by Equation (5), Equation (6); $V_{p_{i,j}}$, the pore volume of an element (i,j); and the total compressibility $C_t$

Definite and Indefinite Matrices

A Positive Definite Matrix is a matrix in which each of the eigenvalues of such matrix are greater than zero. A Negative Definite Matrix is a matrix in which each of the eigenvalues of that matrix A are less than zero. An Indefinite Matrix is a matrix for which some eigenvalues are positive and some eigenvalues are negative. If one eigenvalue of a matrix differs in sign from the remainder of the eigenvalues for that matrix, the matrix is indefinite.

In practice, during a simulation run, if the total compressibility of any grid block becomes negative, the coefficient matrix A becomes indefinite and iterative methods of the reservoir simulation diverge. As mentioned, the negative total compressibility for a grid block may be due to either physical reasons or a combination of rock and fluid derivatives values in certain phase equilibria calculations.

Example for Indefinite Matrix with Convergence Problems for Iterative Methods of Reservoir Simulation The coefficient matrix [T] of Equation (8) of the pressure equation is usually diagonally dominant, hence positive definite. Hence any iterative method will converge to the true solution with different convergence rates. Convergence is affected by the magnitude of the elements of the coefficient matrix A. If the coefficient matrix A is strongly diagonally dominant when the summation of the absolute values of all the elements in a row of the matrix is much less than the absolute value of the diagonal term (number) of the same row In case when the difference between the sum of the non-diagonal elements versus the diagonal element is small then the matrix is called weakly diagonally dominant. Strongly diagonally dominant matrices converge to a true solution within a few computer processing iterations. On the other hand weakly diagonally dominant matrices require many iterations to converge. However, each of these types of matrices in some cases lose diagonal dominance in one or more matrix rows or grid blocks. In such cases, the coefficient matrix [T] may become indefinite. Typical iterative methods will not converge when indefinite coefficient matrices are present.

Recalling Equation (6) expressing the unknown pressures for each grid block linear system of equations for the cells rearranged into matrix form as:

$$T_{i-1/2,j}p_{i-1,j}^{n+1} + T_{i+1/2,j}p_{i+1,j}^{n+1} + T_{i,j-1/2}p_{i,j-1}^{n+1} + T_{i,j+1/2}p_{i,j+1}^{n+1} - \quad (6)$$

$$\left(T_{i-1/2,j} + T_{i+1/2,j} + T_{i,j-1/2} + T_{i,j+1/2} + \frac{C_t V_p(i,j)}{\Delta t}\right)p_{i,j}^{n+1} =$$

-continued $$q_{i,j} - \frac{C_t V_p(i,j)}{\Delta t} p_{i,j}^n$$

In Equation (6) the matrix row for the element (i,j) is expressed as:

$$T_{i-1/2,j}T_{i,j-1/2} - \quad (11)$$

$$\left(T_{i-1/2,j} + T_{i+1/2,j} + T_{i,j-1/2} + T_{i,j+1/2} + \frac{C_t V_p(i,j)}{\Delta t}\right)T_{i+1/2,j}T_{i,j+1/2}$$

Since all the transmissibility values T>0, then the diagonal term in the matrix [T] in absolute value is great than the sum of the all off diagonal terms for $$\frac{C_t V_p(i,j)}{\Delta t} > 0; \text{ or}$$

$$\left(T_{i-1/2,j} + T_{i+1/2,j} + T_{i,j-1/2} + T_{i,j+1/2} + \frac{C_t V_p(i,j)}{\Delta t}\right) > \quad (12)$$

$$(T_{i-1/2,j} + T_{i+1/2,j} + T_{i,j-1/2} + T_{i,j+1/2})$$

If this condition is true for all the rows of the matrix [T], (all the grid blocks (i,j)), then the coefficient matrix [T] is positive definite and the eigenvalues have the same sign.

In case $$\frac{C_t V_p(i,j)}{\Delta t} < 0$$

as represented in Equation (4) is negative in the pressure equation matrix, the total compressibility is negative, that is, $C_t$<0. The coefficient matrix becomes indefinite, with at least one eigenvalue having an opposite sign from the others. Conventional iterative methods do not converge when this happens.

If divergence, or failure to converge, occurs during a simulation run, simulators usually cut the time step size and form a new coefficient matrix T. Forming a new coefficient matrix T is usually very costly, especially for reservoir models with a large number of grid blocks with unknown pressure distributions. Therefore, it is important not to cut the time step size. The present invention provides a convergent method using the same coefficient matrix T even though it may be in certain situations indefinite.

In order to generate a solution in the form of Equation (8), the system must be preconditioned. A Gauss Seidel iterative preconditioning can be used, such as that described in Olsen-Kettle, "Numerical Solution of Partial Differential Equations" previously mentioned, for example.

Since the preconditioner is also an iterative method it does not help solving Equation (1). This is because the iterative computation process will diverge in the presence of an indefinite coefficient matrix. Therefore according to the present invention, an approximate analytical matrix [B] preconditioner (an approximate analytical solution) determines the grid cell pressure distribution when one or more indefinite coefficient matrices are present. This processing is performed during step 228 of the processing according to FIG. 7, as will be described.

Figure 3:
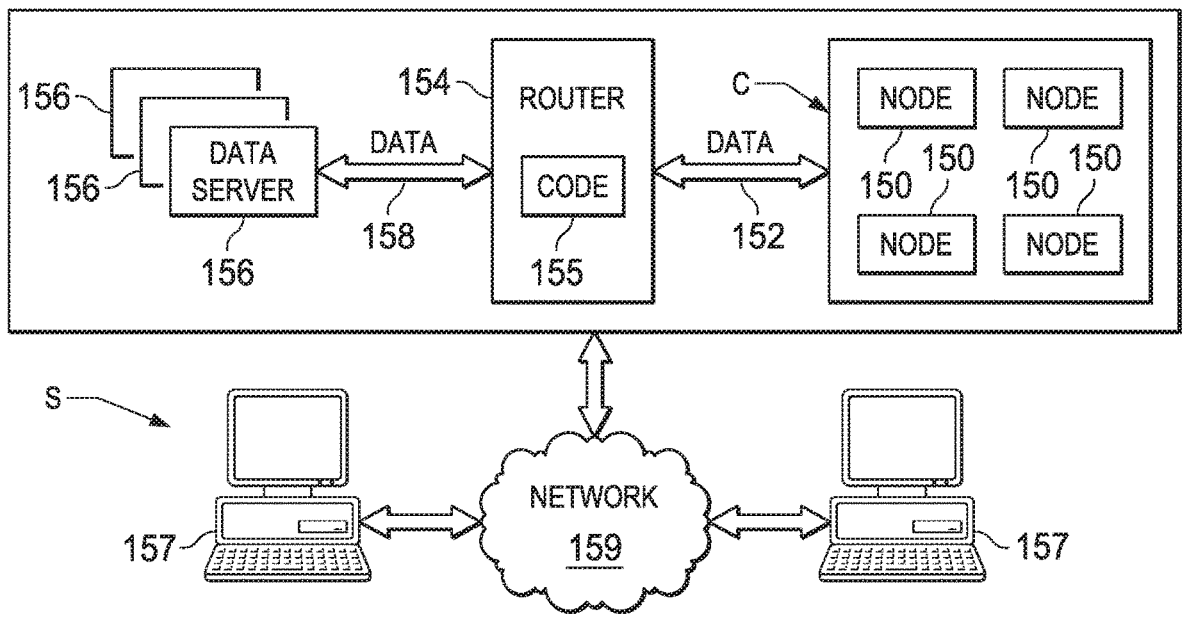
FIG. 3 is a schematic diagram of a computer network for determining pressure distribution in heterogeneous rock formations for reservoir simulation according to the present invention.

The present invention improves performance of a data processing system S (FIG. 3) during determination of pressure distribution among the grid cells of reservoir models. Convergence can prove difficult to obtain when conditions cause an indefinite coefficient matrix to be present. So far as is known, previous iterative methods for determination of pressure distribution have diverged when indefinite coefficient matrices were present.

The conventional processing action of time step cutting on divergence during reservoir simulation is avoided. The present invention permits the reservoir simulation process to continue without reducing time step size. Time step cutting has proven to be very costly, in terms of computer usage and time, for very large reservoirs having models involving millions, billions or more number of unknown parameter values.

With the present invention, determination of pressure distribution by computer processing to solve Equation (1) in matrix form can be expressed as linear combination of what are known as Krylov vectors expressed as follows:

$$p = \sum_{i=1}^{m} c_i v_i \qquad (13)$$

In Equation (13), an upper limit of the number of vectors expressed as a sum, that is, the number of vectors m, is ideally equal to the total number of unknown values for pressure distribution in the reservoir grid elements to be determined. However, as will be explained in later sections, it has been found that the total number of unknown values is much less than the number of Krylov vectors.

Subsequent sections explain how to construct linearly independent vectors $v_i$ as Krylov vectors and select the coefficients $c_i$ for determination of pressure distribution by computer processing according to the present invention.

The approximate analytical solution used as a preconditioner to solve and indefinite matrix system exactly in the same manner without requiring a direct analytical solution method. This is demonstrable by several examples, as will be explained.

Data Processing System S

The processing and workflow according to the present invention are suitable for deployment on a variety of high performance computer (or HPC) cluster computer/processor node computer systems. These are typically rack mounted hardware with several compute nodes which contains multiple CPUs with multi-core architecture. Nodes are typically interconnected with conventional low latency high bandwidth networks, switches, and routers.

It should be understood that the present invention may be performed on a mainframe computer of any conventional type of suitable processing capacity such as those available from International Business Machines (IBM) of Armonk, N.Y. or other source.

The typical HPC environment for use with this simulation system is today's multi-node, multi-CPU, multi-core compute clusters. An example such cluster is illustrated at C in the data processing system S of FIG. 3. The cluster C is formed of a plurality of computer nodes 150 (FIGS. 3 and 4) which are provided with data in parallel as indicated by an arrow 152 by a router server or servers 154. If desired, several such router servers may be used for this purpose. Original simulation or input data of the types described above is stored in a suitable number of data storage/file servers 156. The data storage/file servers 156 store operating instructions, control information and database records for use by the data processing system S.

The router servers 154 operate under control of computer code 155 stored in memory and transfer input simulation data in parallel from the storage servers 156, as well as simulation processing results as indicated by an arrow 158, to and from the computer nodes 150 of the cluster C.

The program codes 155 according to the present invention is in the form of non-transitory computer operable instructions causing the server or servers 154 to index, order, process and transfer the reservoir simulation results. Typically, the data processing system S includes a set of work stations 157 of suitable, conventional type which are connected to the system by a network 159. The work stations 157 provide output data and displays so that reservoir engineers are observe the reservoir simulation results. Based on the reservoir simulation results, the engineers are able to evaluate and take action as needed to monitor and adjust production and performance of the wells and reservoir.

Figure 4:
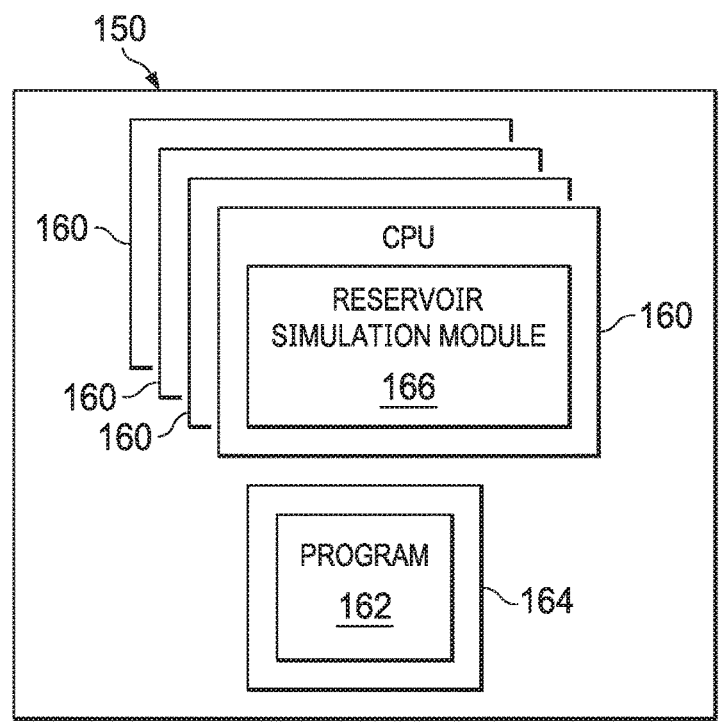
FIG. 4 is a schematic diagram of an application server or computer node of the computer network of FIG. 3.

The computer nodes 150 of the cluster C include a plurality of processors or cores 160 of the type illustrated in FIG. 4 operating in parallel under instructions of a computer code or program product 162 stored in stored in memory 164 of the computer nodes 150. The program code 162 according to the present invention is in the form of non-transitory computer operable instructions causing the data processors 160 to perform reservoir simulation in reservoir simulation modules 166.

It should be noted that program codes 155 and 162 may be in the form of microcode, programs, routines, or symbolic computer operable languages that provide a specific set of ordered operations that control the functioning of the data processing system S and direct its operation. The instructions of program codes 155 and 162 may be stored in memory of the servers 154 or processor nodes 150, or on computer diskette, magnetic tape, conventional hard disk drive, electronic read-only memory, optical storage device, or other appropriate data storage device having a non-transitory computer usable medium stored thereon. Program code 162 may also be contained on a data storage device such as server 156 as a computer readable medium, as shown.

Processing by the Data Processing System S

The present invention provides improved determination of pressure distribution and pressure values over the three dimensions of heterogeneous rock formations of a reservoir such as the reservoir 100 (FIG. 1). The present invention further permits prompt initial pressure measures for pressure determination through the reservoir model during reservoir simulation for the subsurface reservoir 100 when the coefficient matrix becomes indefinite and causes conventional preconditioning to fail to converge.

The present invention avoids the convergence problems during reservoir simulation in those situations without requiring undesirable reduction in time step size of the reservoir simulation. As has been discussed, reduction of time step size increases computer processing operations and complexity and reservoir simulation processing time length. The initial pressure distribution which is determined represents a correct pressure profile within the reservoir for the reservoir simulation.

The estimate of initial pressure is proven by examples to be close to actual solutions based on analytical solutions in simplified reservoir models. The determined initial pressure estimate thus enables the reservoir simulator to converge to a desired solution within specified accuracy limits. Determination of the initial pressure distribution according to the present invention also converges with fewer computer processing iterations than other preconditioning methods, such as either or both of Point Gauss Seidel or Linear Gauss Seidel preconditioners.

Figure 5:
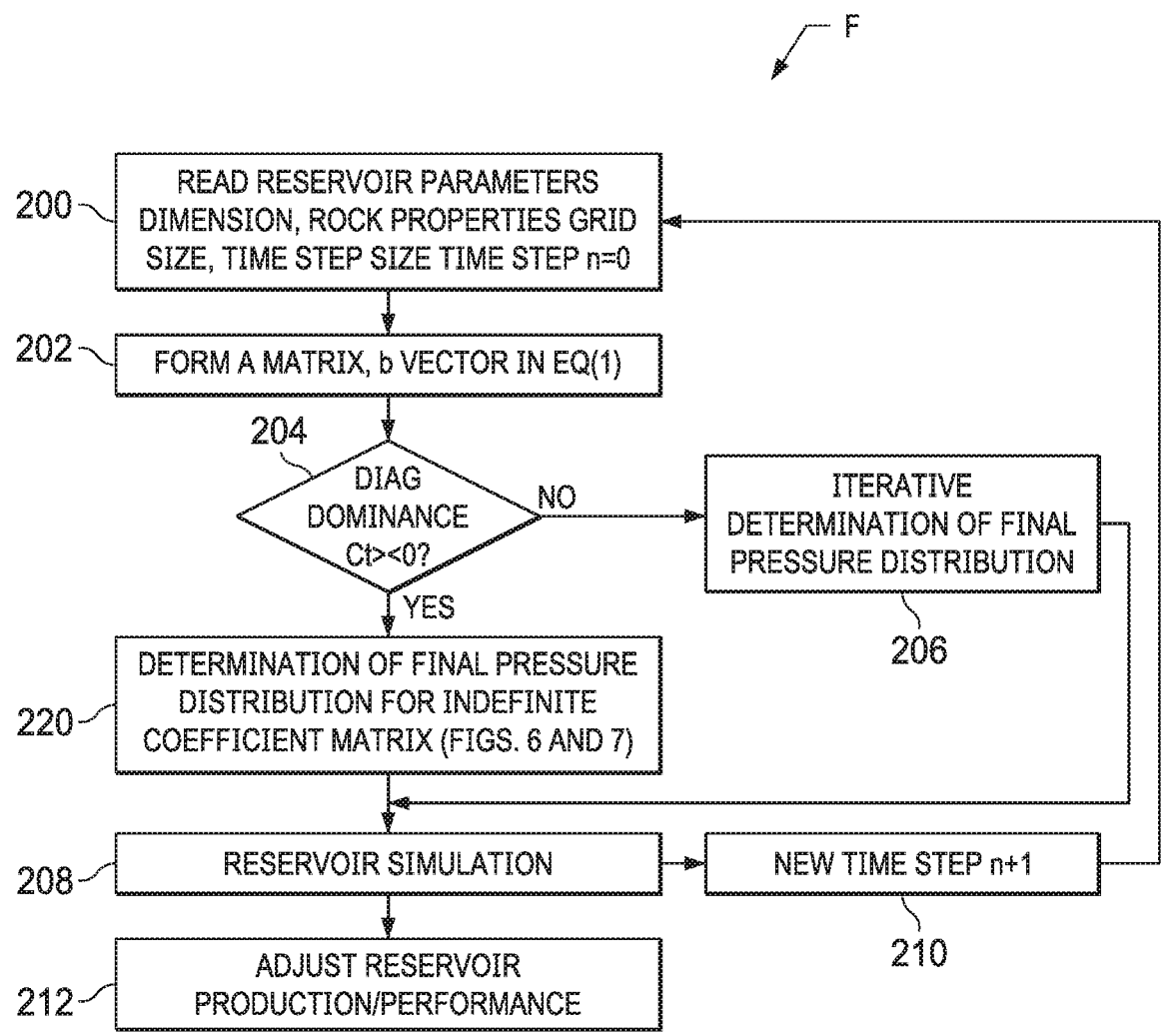
FIGS. 5, 6 and 7 are functional block diagrams or flow charts of workflow for determining pressure distribution in heterogeneous rock formations for reservoir simulation according to the present invention in the presence of an indefinite reservoir coefficient matrix.

FIG. 5 is a schematic diagram of a workflow F outlining a preferred embodiment of a sequence according to the present invention for reservoir simulation based on improved determination of pressure distribution over the three dimensions of heterogeneous rock formations of a reservoir.

During a step 200, simulation begins by reading the reservoir and production data. Reservoir data read in during step 200 data include reservoir geometric information-its size, extent (length) in x, y, and z directions, reservoir properties such as permeability distribution, porosity distribution, thickness of layers, relative permeability data, capillary pressure data, fluid property data such as fluid density tables, formation volume factor tables, viscosity tables, location of wells, and location of well perforations within the reservoir. Production data includes oil, water, and gas production rate measured or specified for the wells defined in the previous step. Production data also includes minimum bottomhole pressure for each well. The reservoir simulator is also initialized during step 200, setting the simulation day and the time step to zero.

During step 202, the reservoir data and reservoir properties are organized to in the data processing system S into a form expressed as the A matrix for the reservoir grid cell blocks of the reservoir model 100 according to Equation (1). During step 202, the production data for the wells in the reservoir are organized for the b vectors for the wells of the reservoir model 100 according to Equation (1), as well.

During step 204, the coefficient matrix A is evaluated to determine if the values of the coefficients for any one or more of the coefficients in the matrix A is negative. If this is not the case, processing proceeds to step 206.

During step 206, final pressure distribution for the grid cells of the reservoir model 100 is determined. This may be done, for example, according to the techniques of Applicant's prior co-pending U.S. patent application Ser. No. 15/963,251, "Determining Pressure Distribution in Heterogeneous Rock Formations for Reservoir Simulation," filed Apr. 26, 2018, which is incorporated herein by reference.

It should also be understood that many other iterative methods may be used during step 206 to determine the pressure distribution in a reservoir. Examples of such iterative methods which can be used when positive definite coefficient matrices are present for determining pressure distribution in reservoirs are described in Stüben, Klaus, "Solving Reservoir Simulation Equations, Ninth International Forum on Reservoir Simulation. Abu Dhabi, United Arab Emirates, pg. 1-53; December 2007.

Processing in the data processing system S by the iterative solver during step 206 continues until convergence is achieved. The pressures so determined then are provided as part of the reservoir simulation during step 206 to determine fluid flow in the grid cells of the reservoir. The pressure distribution in the reservoir cells in the multiple dimensions determined during step 206 is then available for performance of reservoir simulation step 208.

In step 208, reservoir simulation is performed by the reservoir simulator the determined pressure distributions for the cells of the reservoir model 100 resulting from step 206 and the reservoir production data a succession of time steps are used to determine reservoir grid cell fluid compositions, pressures, flow rates, relative presence and related formation parameters relating to multiphase fluids in the reservoir cells organized in multiple dimensions as shown in Equation (7) to calculate the estimate for the pressure distribution for the next fluid flow reservoir simulation time step (n+1).

During reservoir simulation step 208, the pressure estimate determined during step 206 is used in fluid flow reservoir simulation in the reservoir simulation modules 166 of the data processing system S. The reservoir simulation during step 208 is performed in multiple iterations to determine pressures by numerical solution to be used as pressures at a sequence of iterative time steps, as indicated at step 210. The reservoir simulation may be one of several known types, such as those previously mentioned.

Reservoir simulation results obtained during step 208 are then the basis to monitor and adjust either production or performance, or both production and performance, of one or more of the wells, and thus of the reservoir, during step 212. The reservoir engineering activities of step 212 include, for example, one or more of the following reservoir production management operations: adjusting production of fluids from producing wells in the reservoir; adjusting or adding the injection of secondary recovery fluids into injection wells of the reservoir; and drilling of additional wells in the reservoir.

Figure 6:
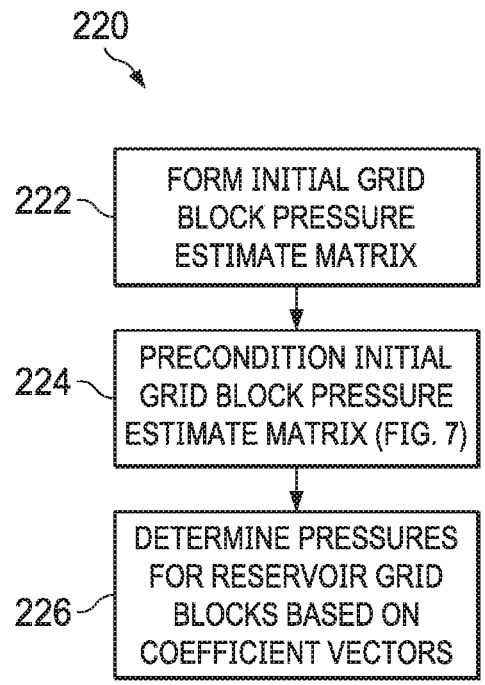

During step 204, if one or more of the coefficients in the coefficient matrix A is negative, processing begins according to the present invention in step 220 (FIGS. 5 and 6). Initial grid block pressures for the grid block cells of the reservoir model 100 resulting from step 202 are made available for processing, as indicated schematically during step 222.

Preconditioning the System

To solve Equation (1) in the data processing system S, that is, [A][p]=[b], preconditioning must be done to achieve convergence within practical number of iterations. In case no preconditioners are used, solution takes excessive numbers of iterations for convergence. This can be expensive in terms of computer processing time and computer processing costs. One of the computationally cheaper preconditioners is what is known as the Gauss Seidel preconditioner. But the Gauss Seidel preconditioning as has been discussed with indefinite coefficient matrices are present.

Figure 7:
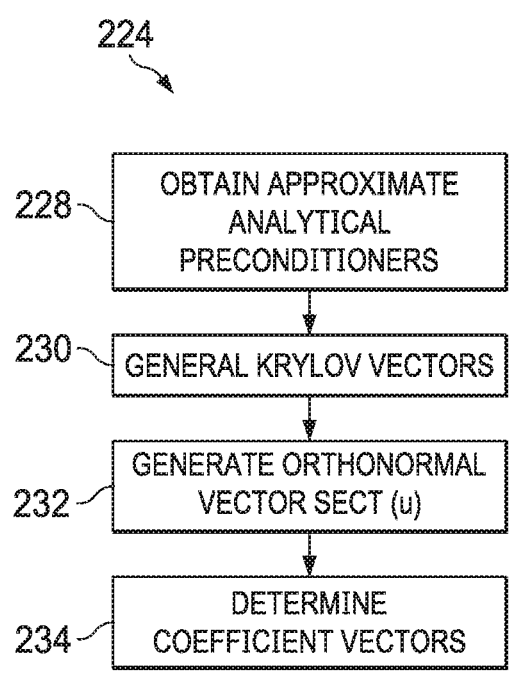

FIGS. 6 and 7 indicate schematically the processing according to step 220 to obtain reservoir pressure distribution for each time step to determine the pressure p for each grid block (i,j) of the reservoir model. Determination of the pressure for each grid block is performed in the data processing system S for a matrix system of linear equations expressed according to Equation (1) as [A][p]=[b], where A is a known coefficient matrix, b is a vector of known magnitudes for the right hand side of the matrix system, and p is a vector is the unknown grid block pressures.

To solve such a system during step 220, a preconditioner matrix is formed in the data processing system S. This is done by multiplying matrix Equation (1) by an inverse of a matrix [B], with matrix [B] representing a preconditioning matrix which is an approximation to matrix [A]. According to the present invention the preconditioning matrix [B] is selected such that it has an inverse matrix, and is inexpensive in terms of computer processing time to compute when multiplied by the matrix [A]. The preconditioner system according to the present invention allows a solution to pressure for each grid block which as will be described is performed by adding Krylov vectors together.

Once the initial approximate pressure p[r(x,y)] for the grid cells of the reservoir model matrix are determined during step 222, the pressure of matrix equation relationship of Equation (1) is preconditioned as indicated schematically at step 224.

During the processing according to step 224, as an initial step 228, the approximate analytical preconditioner [B] is obtained, with the data processing system S determining the preconditioner. The preconditioner formed according to the present invention is referred to as an approximate analytical solution preconditioner.

The matrix [B] is an approximation to A and is widely referred as the "preconditioning matrix" for Equation (1). The matrix [B] is of a form such that when its inverse is multiplied by the right hand side of the Equation (1), a close approximation is provided for the unknown pressure distribution in the reservoir. With the present invention, elements of the matrix [B] are obtained from the approximate analytical solution. The matrix [B] represents a reasonably good approximation to the coefficient matrix [A] such that it is easily invertible. Multiplying Equation (1) with the inverse of [B$^{-1}$] from the left, results in Equation (14):

$$B^{-1}Ap = B^{-1}b \tag{14}$$

which can be abbreviated as Equation (15):

$$\tilde{A}p = \tilde{b} \tag{15}$$

During the processing according to step 228, the pressure due to a source r, at a location indicated at 120 (FIG. 2) of a grid cell in the reservoir model at the new time step in a two dimensional plane (x,y) can be represented by $$p(r - r_*) = p_{max} e^{-\alpha(r - r_*)} \tag{16}$$

Assuming that $r_*$ is small, Equation (2) can be written as $$p(r) = p_{max} e^{-\alpha(r - r_e)} \text{ where:} \tag{17}$$

$$\alpha = \frac{\phi \mu C_T r_e^2}{7.0610^{-3} k \Delta t} \tag{18}$$

The measure of total compressibility $C_T$ is a linear combination of pore (rock) and fluid compressibilities shown as follows:

$$C_T = C_p + S_o C_o + S_w C_w + S_g C_g \tag{19}$$

where the variable names and units are explained in the Nomenclature section. The maximum pressure value (or minimum) due to a single source $p_{max}$ is determined during step 224.

The average reservoir pressure $\bar{p}$ at the current time step is determined from Equation (3) by integrating in the data processing system S over a two dimensional reservoir domain, usually x, y. The average reservoir pressure $\bar{p}$ can also be approximated by simple summation of Equation (3) over the grid blocks as shown below $$\bar{p} = \frac{\sum_{i=1}^{Nx} \sum_{j=1}^{Ny} p_{max} e^{-\alpha r(x,y)} dv_p}{v_{pT}} \tag{20}$$

where the radial distance from a point $x_*$, $y_*$ is defined as $r = \sqrt{(x - x_*)^2 + (y - y_*)^2}$ and $V_p$ is the pore volume of a grid block, defined by $V_p = \Delta x \cdot \Delta y \cdot \Delta z \cdot \varphi$.

Using volume balance, the average reservoir pressure $\tilde{p}$ is given by:

$$\bar{p} = \frac{-q \Delta t}{V_{pt} C_t} \tag{21}$$

For simplicity purposes, it is assumed that initial reservoir pressure at the old time step n is zero. Equating the values of the pressures according to Equations (20) and (21), the unknown maximum pressure $p_{max}$ can be expressed according to Equation (22):

$$p_{max} = \frac{-q \Delta t}{\sum_{i=1}^{Nx} \sum_{j=1}^{Ny} e^{-\alpha r(x,y)} dv_p} \tag{22}$$

Equation (16) in conjunction with Equation (22) describes the approximate pressure distribution at the new time step in the reservoir. For the purposes of the present invention, time step according to Equation (2) can be considered an approximation to the solution of Equation (1) for a single producing well. This determination avoids the requirement of the use of an iterative preconditioner, which does not converge when the transmissibility matrix for the reservoir is indefinite.

Multiple Wells

If the reservoir contains multiple producing or injecting wells, the pressure distribution at the new time step can be approximated by superposition, again for the purpose of simplicity assuming the old time step pressures are zero. Assuming there are $n_w$ wells in the reservoir with the rates of $q_i$, i=1, . . . , $n_w$, the maximum pressure value $p_{max(iw)}$ for each well iw acting alone is determined from Equation (5) and Equation (6). The approximate pressure value p[r(x,y)] at any radius r measured from the well iw is determined by superposing into a composite solution the individual pressure solutions determined for each of the single producing wells.

$$p[r(x, y)] = \sum_{iw=1}^{n_w} p_{max(iw)} e^{-\alpha[r(x,y) - r(x(iw), y(iw))]} \tag{23}$$

where r(x(iw), y(iw)) is the coordinate of the well (iw).

After the approximate analytical preconditioner is obtained as a result of step 228, step 230 is performed to generate Krylov vectors. Coefficients for the Krylov vectors are determined during step 230, so that coefficients determined during step 234 can then be are added together to obtain the pressure for each grid block (i,j) in the reservoir model in step 226.

The data processing system S during step 230 (FIG. 7) forms what are known as Krylov vectors from the grid coefficient matrix. Generation of the vectors during step 230 is in Krylov subspace of vectors generated from Equation (9). During step 230, K represents a set of each of the Krylov vectors generated from Equation (8), and therefore Equation (1). The set K in Krylov vector format is expressed as follows:

$$K = \{\tilde{b}, \tilde{A}\tilde{b}, \tilde{A}(\tilde{A}\tilde{b}), \tilde{A}(\tilde{A}(\tilde{A}\tilde{b})), \dots \}, \quad (24)$$

$$K = \{v_1, \tilde{A}v_1, \dots$$
$$= \{v_1, v_2, \tilde{A}v_2, \dots$$
$$= \{v_1, v_2, v_3, \tilde{A}v_3, \dots \}.$$

Vector 1, $v_1$ $$\tilde{b} = v_1 = B^{-1}b \quad (25)$$

which means $$Bv_1 = b$$

Using Equation (23), vector b includes the well production rates q to solve for p. Second Krylov Vector, $v_2$ $$v_2 = \tilde{A}\tilde{b} = \tilde{A}v_1 = B^{-1}A\tilde{b} \text{ which means } Bv_2 = A\tilde{b} = Av_1 \quad (26)$$

Using Equation (23) to solve for $v_2$, the right hand side $Av_1$ of Equation (26) can be treated as well production rates q in Equation (23).
For the ith vector, $$Bv_i = Av_{i-1}$$

$$i = 1, \dots m < n \quad (27)$$

Using Equation (23) to solve for $v_i$, $Av_{i-1}$ can be treated as the production rates q for each grid block. In Equation (23), m is the dimension of the vector space. The dimension m in vector space is much smaller than the number of unknowns n in Equation (1). Also it can be considered that m is the number of vectors to construct a solution to Equation (1) beyond which v vectors become linearly dependent.

Krylov vectors avoid the need to perform matrix multiplication. Krylov vectors obtained according to the present invention in the data processing system S offer advantages for the reservoir grid cell pressure determinations. The coefficient matrix [A] is sparse in that only certain of the matrix diagonals are non-zero, but with most of the matrix having zero elements. Since these portions of the matrix have zeros as values, it is not required that computer storage be allocated for the zero elements of the matrix.

However, for the solution of Equation (1), the matrix [A] must be inverted. However, any inverse of matrix [A] for a reservoir of production significance becomes a full matrix, in which all the matrix elements are non-zero. An inversion process for such a matrix is highly difficult and computationally intensive and expensive. Computations and storage would be extremely high, that is, a reservoir matrix the form of a 1 million by 1 million grid cell full matrix requires 1,000 billion storage locations in a computer memory which is not possible for most computers. Krylov vectors enable use of sparse matrix vector multiplication only, the results of which each yields a vector of N unknowns, and thus requires much less computer memory storage. Krylov vectors provide an expression for the solution to matrix Equation (1), with little computer cost and storage requirements.

During step 232, the Krylov vectors K composed of the individual Krylov vectors $v_i$ formed during step 230 are converted into an orthonormal vector matrix composed of a corresponding orthonormal vector set $\{u_1, u_2, \dots u_m\}$ from the original vectors $\{v_1, v_2, \dots v_m\}$ the individual Krylov vectors $\{v_1, v_2, \dots v_m\}$.

Othogonalization and orthonormalization are formed in order to make the vectors perpendicular to each other, and orthonormalization is just making the vector length to unity (normalization). Orthogonalization and orthonormalization are performed on in order that the vectors are be perpendicular (orthogonal) to each other in order to express the unknown vector (which is a solution vector) to be expressed in terms of a summation of the orthogonal vectors.

Conversion of the Krylov vectors K during step 232 may be done in several conventional manners, such as by using what are known as either Gram Schmidt or Arnoldi vector orthogonalization. An example of such conversion is described at Lambers, Jim "Mat 415/515: Gram-Schmidt Orthogonalization Lecture 3 Notes" (2014) http://www.math.usm.edu/lambers/mat415/lecture3.pdf Computation of the Unknown Coefficients $c_i$ Step 234 involves the determination of the unknown coefficients $c_i$ for determination of the pressure distribution among the grid blocks of the reservoir cell model. For the purpose of the step 234, the solution to the digitized form of the pressure distribution in the reservoir grid blocks according to Equation (1) is expressed in the following form:

$$p = \sum_{i=1}^{m} c_i u_i \quad (28)$$

It is to be noted that the orthogonalized vectors $u_i$ in Equation (28) are in fact approximate solutions to Equation (1). In the case that the value of a vector u is a perfect solution, then in Equation (28), the number of coefficients is only one, m=1, and only one vector is needed to express the solution. Therefore, it is important to obtain reasonably accurate estimates of the solutions for the values of the u vectors. Next the residue of the preconditioned system of Equation (9) is defined as:

$$r = b - Ap \quad (29)$$

Substituting Equation (28) into Equation (15) and defining a quadratic function j in the following Equation (30)

$$J(c_1, c_2, \dots c_m) = r^T r = \left(b - \sum_{i=1}^{m} c_i A u_i\right)^T \left(b - \sum_{i=1}^{m} c_i A u_i\right) \quad (30)$$

The minimum of quadratic function j with respect to the unknown coefficients $c_1, c_2, \dots c_m$ occurs at the first derivative of j with respect to each coefficient to zero. Performing these operations results in the following set of linear equations for the unknown coefficients $c_1, c_2, \dots c_m$ as follows:

$$\begin{bmatrix} <Au_1, Au_{1>} & <Au_2, Au_{1>} & \dots & <Au_m, Au_{1>} \\ <Au_1, Au_{2>} & <Au_2, Au_{2>} & \dots & <Au_m, Au_{2>} \\ \vdots & \vdots & \vdots & \vdots \\ <Au_1, Au_{m>} & <Au_2, Au_{m>} & \dots & <Au_m, Au_{m>} \end{bmatrix} \begin{bmatrix} c_1 \\ c_2 \\ \vdots \\ c_m \end{bmatrix} = \begin{bmatrix} <b, Au_1> \\ <b, Au_2> \\ \vdots \\ <b, Au_m> \end{bmatrix} \quad (31)$$

The linear system in Equation (31) usually should have smaller size (number of linearly independent vectors generated from the Krylov system is usually much less than n) therefore it can be solved by processing with direct method-Gaussian elimination, examples of which are described at Wikipedia, "Gaussian Elimination" pgs. 1-8; https://en.wikipedia.org/wiki/Gaussian_elimination The pressure estimate determined during step 234 is used during step 226 for reservoir simulation in the manner that has been described to determine reservoir grid cell fluid compositions, pressures, flow rates, relative presence and related formation parameters relating to multiphase fluids in the reservoir cells for monitoring and adjusting production and performance of the wells and reservoir during step 208.

EXAMPLES

Results

A first example of the present invention is demonstrated on a small problem to illustrate an indefinite matrix case in which we can the eigenvalues of the coefficient matrix A are readily determinable.

Example 1

Two Dimensional Heterogeneous Reservoir, 5×5 Grid

Figure 8:
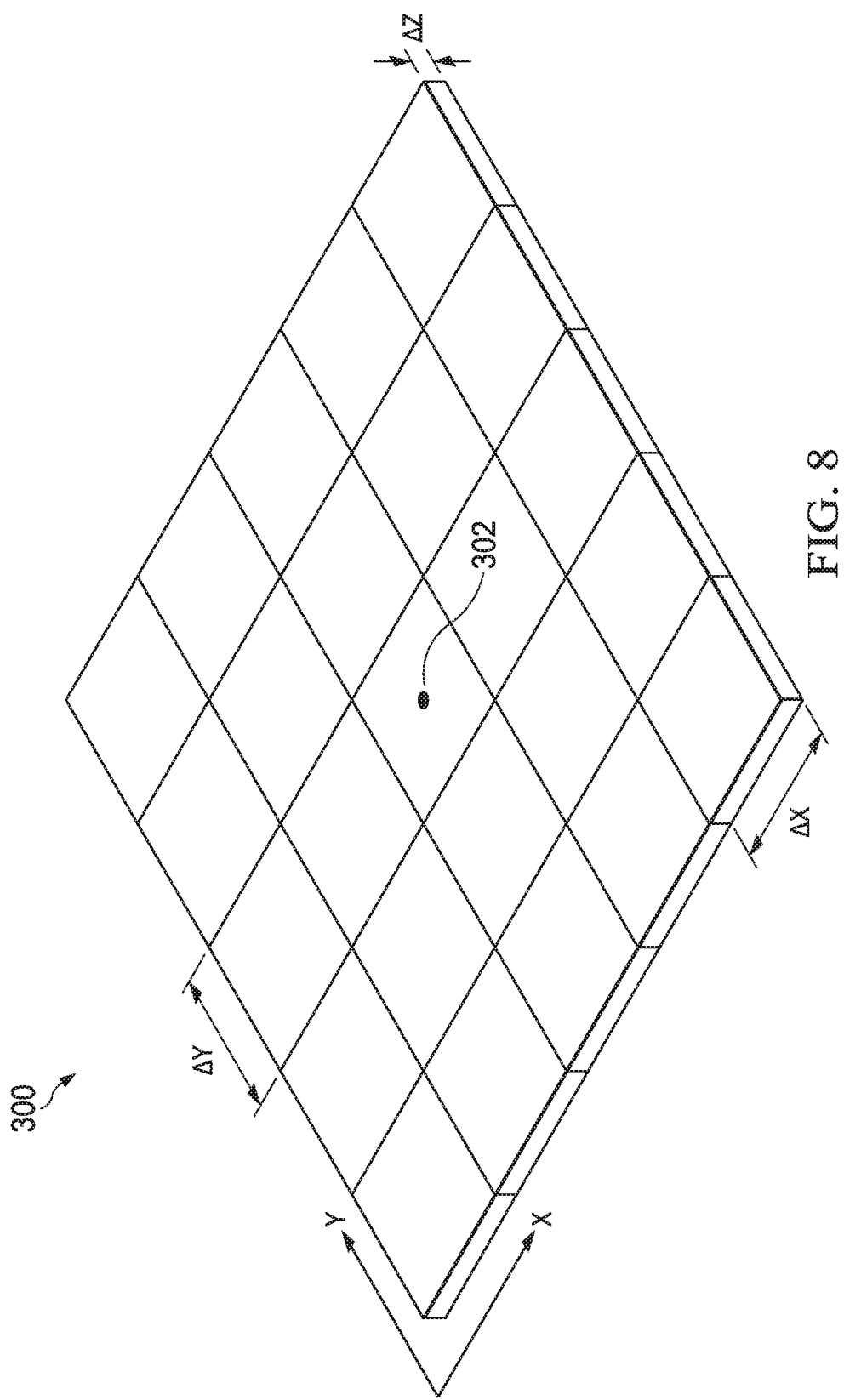
FIG. 8 is a schematic diagram of a simplified reservoir model for obtaining comparative results of pressure distributions according to the present invention in comparison with prior art methods.

FIG. 8 is a schematic diagram of a simplified reservoir model 300 for obtaining comparative results of pressure distributions according to the present invention in comparison with the results of prior art methods. The example reservoir 300 is an oil reservoir, operating above the bubble point pressure of the slightly compressible fluid. It has a 3,000 ft×3,000 ft square area, with no flow boundary conditions and there can be multiple wells injecting or producing. For this example a single injector well is assumed present as indicated at 302 located at the center. Therefore, areal grid size was $\Delta x = \Delta y = 600$ ft, with $\Delta z = 30$ ft thickness, and with the number of cells $N_x = 5$, $N_y = 5$.

Reservoir & Fluid Data

For an example simulation, initial reservoir pressure is 3,000 psi, single phase fluid viscosity=1 cP. Total compressibility is assumed 3E-6 1/psi for the entire reservoir, except the location 302 at the center where the injector well is located. Total compressibility $C_T$ at the center cell was assumed −300E-6 1/psi. Random permeability and porosity distribution was present in the X and Y dimensions of the reservoir model 300 as set forth below:

Random Permeability and Porosity Distribution

Min $K_x = 0.2677$ mD; max $K_x = 49.8$ mD; average $K_x = 24.6$ mD
Min $K_y = 5.01$ mD, max $K_y = 49.95$ mD, average $K_y = 30.75$ mD

Porosity Distribution

Min $\varphi = 0.01$; max $\varphi = 0.2$; average $\varphi = 0.12$
Maximum number of Krylov Vectors to be generated=5
Eigenvalues of the coefficient matrix A:
−0.388E+01   −0.269E+01   −0.148E+01   0.101E+01   −0.562E+01
0.485E+01   −0.164E+01   −0.851E+00   −0.635E+00   −0.184E+01
−0.198E+01   −0.304E+00   −0.335E+01   −0.320E+01   −0.404E+01
0.295E+01   −0.953E+00   −0.157E+00   −0.287E+01   −0.142E+01
0.461E+01   −0.633E+01   −0.422E+01   −0.219E+01   −0.367E+00

As seen all the eigenvalues of coefficient matrix A have a negative sign, except the fourth eigenvalue (1.01), which has the positive sign. The coefficient matrix A is thus indefinite.

Simulation

A reservoir simulator was run for one time step to determine the pressure distribution for this example at a time of 30 days, using three preconditioning methods for comparative purposes: Point Gauss Seidel preconditioning; Line Gauss Seidel preconditioning; and the methodology according to the present invention were performed.

The pressure distribution determined for the simplified model of FIG. 8 as determined by Gaussian elimination, as well as the pressure distribution after a selected number of iterations according to the present invention are set forth in Tables 1, 2 and 3 as follow:

TABLE 1

Exact Solution by Direct Method (Gaussian Elimination)
Exact well pressure = 2702.05 psi
Pressure distribution at time = 30 days.

| | | | | |
|---|---|---|---|---|
| 0.27768E+04 | 0.27675E+04 | 0.27540E+04 | 0.27599E+04 | 0.27657E+04 |
| 0.27812E+04 | 0.27695E+04 | 0.27224E+04 | 0.27526E+04 | 0.27597E+04 |
| 0.27805E+04 | 0.27651E+04 | 0.27021E+04 | 0.27376E+04 | 0.27540E+04 |
| 0.27796E+04 | 0.27693E+04 | 0.27292E+04 | 0.27438E+04 | 0.27542E+04 |
| 0.27784E+04 | 0.27695E+04 | 0.27413E+04 | 0.27515E+04 | 0.27552E+04 |

TABLE 2

Solution by the Present Invention at Iteration 10
Well Pressure = 2708.78 psi

| | | | | |
|---|---|---|---|---|
| 0.27643E+04 | 0.27578E+04 | 0.27488E+04 | 0.27551E+04 | 0.27612E+04 |
| 0.27671E+04 | 0.27595E+04 | 0.27245E+04 | 0.27516E+04 | 0.27579E+04 |
| 0.27656E+04 | 0.27562E+04 | 0.27088E+04 | 0.27400E+04 | 0.27549E+04 |
| 0.27642E+04 | 0.27593E+04 | 0.27320E+04 | 0.27456E+04 | 0.27553E+04 |
| 0.27645E+04 | 0.27592E+04 | 0.27411E+04 | 0.27523E+04 | 0.27561E+04 |

TABLE 3

Solution by the Present Invention at Iteration = 120
Well Pressure = 2702.84 psi

| | | | | |
|---|---|---|---|---|
| 0.27753E+04 | 0.27663E+04 | 0.27534E+04 | 0.27593E+04 | 0.27653E+04 |
| 0.27795E+04 | 0.27683E+04 | 0.27226E+04 | 0.27525E+04 | 0.27596E+04 |
| 0.27787E+04 | 0.27639E+04 | 0.27028E+04 | 0.27379E+04 | 0.27542E+04 |
| 0.27776E+04 | 0.27681E+04 | 0.27296E+04 | 0.27441E+04 | 0.27544E+04 |
| 0.27767E+04 | 0.27682E+04 | 0.27413E+04 | 0.27516E+04 | 0.27553E+04 |

FIG. 9 is a display of comparative results of convergence error in pressure distribution determination according to the present invention against processing results according to the prior art for the reservoir model 300. The convergence behavior of Point Gauss Seidel (PGS) is indicated at 304, convergence behavior of the Line Gauss Seidel (LGS) method is indicated at 306. Convergence behavior according to the present invention is indicated in FIG. 9 at 308.

As seen in FIG. 9, the maximum residual error in barrels per day (b/d) is shown on the vertical axis, and horizontal axis shows the number of iterations. As indicated, both the Point Gauss Seidel and Line Gauss Seidel methods diverge while the present invention converges.

For example at the end of 10 iterations, maximum residual (error) is 1,571,846 b/d for the Point Gauss Seidel method, 6,657,102,829 b/d for the Line Gauss Seidel and only 2.5 b/d for the present invention. The present invention offers a convergent solution to the correct solution, while in contrast the Point Gauss Seidel and Line Gauss Seidel methods do not. Furthermore, the present invention uses sparse matrixes rather than full matrixes. Therefore, the present invention offers an effective alternative which converges for solving matrices with hundreds of millions of unknowns. This is a saving in computer processing and operational time for reservoir matrix processing solutions, and that it is not necessary to continue to perform repeated iterations which do not converge, but rather diverge. Further, the conventional approach of time step cutting which introduces further complex computer processing is not necessary and does not need to be performed. This is a further improvement in computer operation according to the present invention.

Example 2

100×100 Grid

Figure 10:
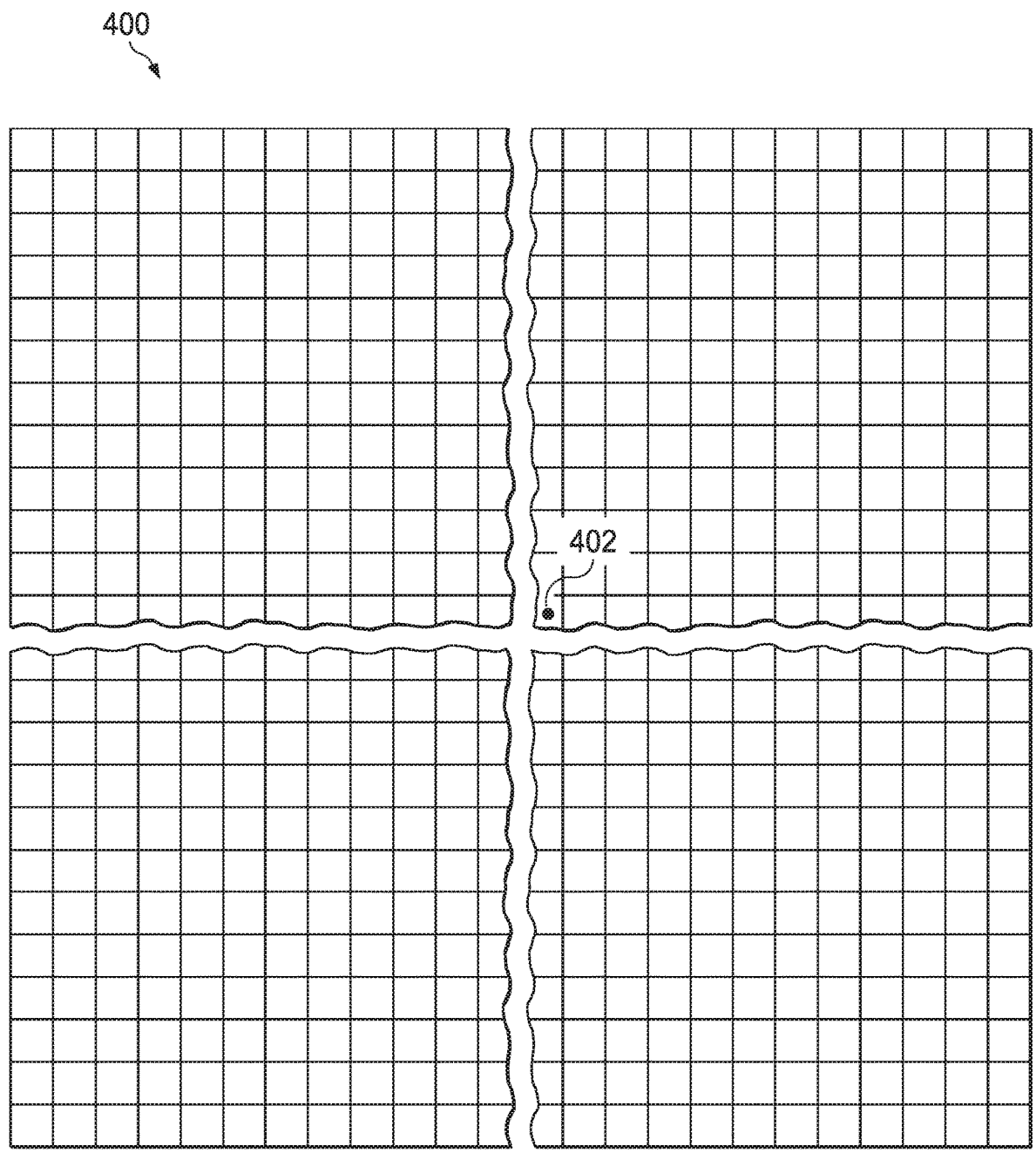
FIG. 10 is a schematic diagram of a simplified reservoir model for obtaining comparative results of pressure distributions according to the present invention in comparison with prior art methods.

FIG. 10 is a schematic diagram of a simplified example reservoir model 400 for Example 2. A well is located at 402 near center (50, 50) of the model 400. The well at location 402 is for the purposes of Example 2 injecting 1,000 b/d. The length of the reservoir in the model 400 is 60,000 ft in each x, y direction, yielding the same grid sizes as Example 1. Total compressibility $C_T$ of the cells (50, 50) and (51, 50) are −300E-6, 1/psi, and the total compressibility for the remaining cells of the model 400 are 3E-6 1/psi total compressibility. The reservoir model 400 of Example 2 is configured as a heterogeneous reservoir with the same vertical thickness and statistical properties in Example 1.

FIG. 11 is a display of comparative results of convergence error in pressure distribution determination for the reservoir model 400 determined according to the present invention against processing results obtained according to the prior art Point Gauss Seidel or Linear Gauss Seidel preconditioners.

As shown at 404 and 406 in FIG. 11, both Point Gauss Seidel and Line Gauss Seidel methods diverged. As indicated at 408, the present invention was able to reduce the residual error to 1.3 percent of the grid block pore volume which corresponds to an error of 65 b/d. Further iterations according to the present invention iterations show steady but small decrease in the residuals. This example further verifies that the present invention can find the correct solution while the other iterative methods fail to converge, requiring time step cutting in an attempt to complete the reservoir simulation run.

Example 3

Million Cell Heterogeneous Problem (1,000×1,000)

Figure 12:
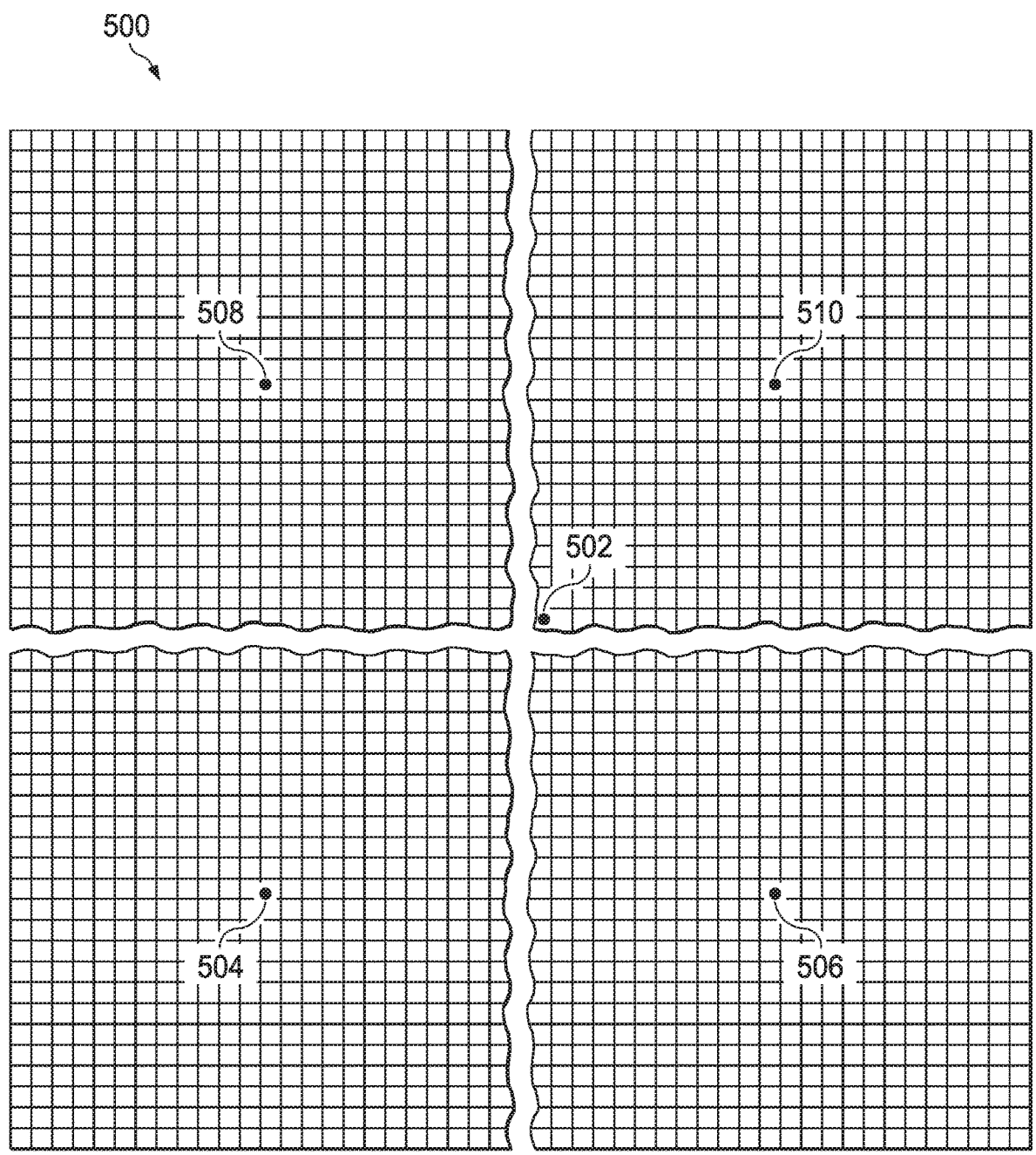
FIG. 12 is a schematic diagram of a simplified reservoir model for obtaining comparative results of pressure distributions according to the present invention in comparison with prior art methods.

FIG. 12 is a schematic diagram of a simplified example reservoir model 500 for Example 3. A well 502 is located as indicated at the center of the model 500, and four additional wells 504, 506, 508 and 510 at the centers of each quadrant of the model 500. Each of these five wells are for the purposes of this example injecting at 1,000 b/d. Negative compressibility grid blocks are established as present for grid cells one block west, east, north, south of well 502 and the well block at the center of the model 500. The remaining parameters, vertical thickness and statistical properties are the same as in Examples 2 and 3.

FIG. 13 is a display of comparative results of convergence error in pressure distribution determination for the model 500. As can be seen at 530 and 532, both Point Gauss Seidel and Line Gauss Seidel methods diverge. The present invention shows convergent behavior as indicated at 534. The initial residual (maximum norm) 1,000 b/d has been reduced to 707.8 b/d in 10 iterations which corresponds to 12.8% of the grid block pore volume. Further iterations can be seen to decrease the residual and that processing according to the present invention converges.

Again, as shown at 530 and 532 in FIG. 13, both Point Gauss Seidel and Line Gauss Seidel methods diverged. This additional example further verifies that the present invention can find the correct solution while the other iterative methods fail to converge, requiring time step cutting in an attempt to complete the reservoir simulation run.

In each of FIGS. 9, 11 and 13 it can thus be seen that both conventional Point Gauss Seidel and the Line Gauss Seidel iterative preconditioner methods diverged. Specifically, the error in the pressure calculations increased as the number of iterations increased. Therefore, these conventional preconditioner methods cannot yield a correct pressure distribution. On the other hand, it can be seen that the present invention in each of Examples 1, 2 and 3 as shown in FIGS. 9, 11, and 13, error in the pressure determinations is reduced as a result of successive iterations. Therefore, the present invention provides correct pressure solutions and converges as the number of iterations increases.

It can thus be seen that the present invention improves the functioning of computer during reservoir simulation operations. The present invention provides the capability for the computer during determination of pressure distribution in reservoir models for reservoir simulation to converge in the event that an indefinite coefficient matrix is determined to be present. The present invention avoids the conventional prior art remedial action in such circumstances of time step cutting.

The invention has been sufficiently described so that a person with average knowledge in the field of reservoir modeling and simulation may reproduce and obtain the results mentioned in the invention herein. Nonetheless, any skilled person in the field of technique, subject of the invention herein, may carry out modifications not described in the request herein, to apply these modifications to a determined structure and methodology, or in the use and practice thereof, requires the claimed matter in the following claims; such structures and processes shall be covered within the scope of the invention.

It should be noted and understood that there can be improvements and modifications made of the present invention described in detail above without departing from the spirit or scope of the invention as set forth in the accompanying claims.

What is claimed is:

1. A computer implemented method of monitoring and adjusting production of one or more wells extending into a reservoir producing hydrocarbons, the method comprising:
   obtaining reservoir data comprising geometric information indicative of the size and extent of the reservoir, reservoir properties indicative of properties of formation rock of the reservoir, fluid properties indicative of properties of fluids in the formation, and well information indicative of the location of wells in the reservoir;
   obtaining production data comprising measured production rates for the wells in the reservoir;

conducting a reservoir simulation of fluid flow in the reservoir for a sequence of time steps, the reservoir simulation comprising the following:

for a first time step in the sequence of time steps, forming, based on the reservoir data and the production data, an initial computer matrix of known reservoir attributes and an initial computer vector of actual reservoir fluid production measures;

determining that the initial computer matrix of known reservoir attributes is diagonally dominant;

in response to determining that the initial computer matrix of known reservoir attributes is diagonally dominant:

determining a first pressure distribution in individual ones of grid cells of the reservoir for the first time step of the reservoir simulation based on an initial measure of pressure distribution in the individual ones of the grid cells of the reservoir for the first time step;

determining an estimated fluid flow rate in the grid cells of the reservoir for the first time step of the reservoir simulation based on the pressure distribution in the grid cells of the reservoir determined for the first time step;

determining that the estimated fluid flow rate in the grid cells of the reservoir for the first time step has converged; and in response to determining that the first estimated fluid flow rate in the grid cells of the reservoir has converged, associating the first estimated fluid flow rate with the first time step;

for a second time step in the sequence of time steps, forming a second initial computer matrix of known reservoir attributes and a second initial computer vector of actual reservoir fluid production measures, wherein the first time step and the second time step are of the same size;

determining that the second initial computer matrix of known reservoir attributes is not diagonally dominant;

in response to determining that the second initial computer matrix of known reservoir attributes is not diagonally dominant:

generating an approximate analytical preconditioner for the second time step;

applying the approximate analytical preconditioner generated to the initial computer matrix of known reservoir attributes to form measures of pressure distribution in the grid cells of the reservoir for the second time step;

generating Krylov vectors from the measures of pressure distribution in the grid cells of the reservoir formed for the second time step;

determining coefficient vectors of reservoir pressure distribution for the second time step from the generated Krylov vectors from the measures of pressure distribution formed;

determining a second estimated fluid flow rate in the grid cells of the reservoir for the second time step of the reservoir simulation based on the coefficient vectors of reservoir pressure distribution determined for the second time step;

determining that the second estimated fluid flow rate in the grid cells of the reservoir for the second time step has converged based on the determined coefficient vectors of reservoir pressure distribution; and in response to determining that the second estimated fluid flow rate in the grid cells of the reservoir for the second time step has converged, associating the second fluid flow with the second time step;

determining, based on the first and second estimated fluid flow rates, a production rate for a well in the reservoir; and operating, in response to the determination of the production rate for the well, the well in accordance with the production rate.

2. The method of claim 1, further including the step of adjusting performance of at least one of the wells based on the reservoir simulations.

3. The method of claim 1, further including the computer processing step of incrementing to a subsequent time step ending the reservoir simulation when the determined fluid flow rate has converged.

4. The method of claim 1, further including the computer processing step of converting the generated Krylov vectors to orthogonal Krylov vectors in response to determining that the second initial computer matrix of known reservoir attributes is not diagonally dominant.

5. The method of claim 4, further including the computer processing step of performing orthonormalization of the orthogonal Krylov vectors in response to determining that the second initial computer matrix of known reservoir attributes is not diagonally dominant.

6. The method of claim 5, wherein the computer processing step of determining coefficient vectors of reservoir pressure distribution comprises the computer processing step of determining coefficient vectors of reservoir pressure distribution after the step of performing orthonormalization of the orthogonal Krylov vectors.

7. The method of claim 1, wherein the computer processing step of determining coefficient vectors of reservoir pressure distribution comprises the computer processing step of processing a linear system of coefficient vectors by performing Gaussian elimination of the linear system.

8. The method of claim 1, wherein the approximate analytical preconditioner comprises a matrix (B), and wherein the applying the approximate analytical preconditioner generated to the initial computer matrix of known reservoir attributes to form measures of pressure distribution in the grid cells of the reservoir for the second time step comprises applying the generated approximate analytical preconditioner to the initial computer matrix of known reservoir attributes according to the following equation to form the measures of pressure distribution in the grid cells of the reservoir:

$$B^{-1}Ap = B^{-1}b$$

where:
$B^{-1}$ is the inverse of matrix B,
A is the initial computer matrix of known reservoir attributes,
b is a vector of known magnitude, and
p is a vector corresponding to the measures of pressure distribution in the grid cells of the reservoir to be determined for the second time step.

9. A data processing system for monitoring and adjusting production of one or more wells extending into a reservoir producing hydrocarbons, the system comprising a processor configured to perform the following operations:

obtaining reservoir data comprising geometric information indicative of the size and extent of the reservoir, reservoir properties indicative of properties of formation rock of the reservoir, fluid properties indicative of properties of fluids in the formation, and well information indicative of the location of wells in the reservoir;

obtaining production data comprising measured production rates for the wells in the reservoir;

conducting a reservoir simulation of fluid flow in the reservoir for a sequence of time steps, the reservoir simulation comprising the following:

for a first time step in the sequence of time steps, forming, based on the reservoir data and the production data, an initial computer matrix of known reservoir attributes and an initial computer vector of actual reservoir fluid production measures;

determining whether the initial computer matrix of known reservoir attributes is diagonally dominant;

in response to determining that the initial computer matrix of known reservoir attributes is diagonally dominant:

determining a pressure distribution in individual ones of grid cells of the reservoir for the time step of the reservoir simulation based on an initial measure of pressure distribution in the individual ones of the grid cells of the reservoir for the time step;

determining an estimated fluid flow rate in the grid cells of the reservoir for the time step of the reservoir simulation based on the pressure distribution in the grid cells of the reservoir determined for the time step;

determining that the estimated fluid flow rate in the grid cells of the reservoir for the time step has converged; and in response to determining that the first estimated fluid flow rate in the grid cells of the reservoir has converged, associating the first estimated fluid flow rate with the time step; and in response to determining that the initial computer matrix of known reservoir attributes is not diagonally dominant:

generating an approximate analytical preconditioner for the second time step;

applying the approximate analytical preconditioner generated to the initial computer matrix of known reservoir attributes to form measures of pressure distribution in the grid cells of the reservoir for the time step;

generating Krylov vectors from the measures of pressure distribution in the grid cells of the reservoir formed for the time step;

determining coefficient vectors of reservoir pressure distribution for the time step from the generated Krylov vectors from the measures of pressure distribution formed;

determining a second estimated fluid flow rate in the grid cells of the reservoir for the time step of the reservoir simulation based on the coefficient vectors of reservoir pressure distribution determined for the time step;

determining that the estimated fluid flow rate in the grid cells of the reservoir for the second time step has converged based on the determined coefficient vectors of reservoir pressure distribution; and in response to determining that the second estimated fluid flow rate in the grid cells of the reservoir for the time step has converged, associating the second fluid flow with the time step, wherein the time step is maintained at the same size for both of the instance when the initial computer matrix of known reservoir attributes is determined to be diagonally dominant and the instance when the initial computer matrix of known reservoir attributes is determined to be not diagonally dominant;

determining, based on the estimated fluid flow rate associated with the time step, a production rate for a well in the reservoir; and operating, in response to the determination of the production rate for the well, the well in accordance with the production rate.

10. The data processing system of claim 9, the steps further including converting the generated Krylov vectors to orthogonal Krylov vectors.

11. The data processing system of claim 10, the steps further including performing orthonormalization of the orthogonal Krylov vectors.

12. The data processing system of claim 11, wherein the determining of coefficient vectors of reservoir pressure distribution comprises determining coefficient vectors of reservoir pressure distribution after performing orthonormalization of the orthogonal Krylov vectors.

13. The data processing system of claim 11, wherein the determining of coefficient vectors of reservoir pressure distribution comprises processing a linear system of coefficient vectors by performing Gaussian elimination of the linear system.

14. The system of claim 9, wherein the approximate analytical preconditioner comprises a matrix (B), and wherein the applying the approximate analytical preconditioner generated to the initial computer matrix of known reservoir attributes to form measures of pressure distribution in the grid cells of the reservoir for the second time step comprises applying the generated approximate analytical preconditioner to the initial computer matrix of known reservoir attributes according to the following equation to form the measures of pressure distribution in the grid cells of the reservoir:

$$B^{-1}Ap = B^{-1}b$$

where:
$B^{-1}$ is the inverse of matrix B,
A is the initial computer matrix of known reservoir attributes,
b is a vector of known magnitude, and
p is a vector corresponding to the measures of pressure distribution in the grid cells of the reservoir to be determined for the time step.

* * * * *